US012675957B2

(12) United States Patent
Phillips et al.

(10) Patent No.: US 12,675,957 B2
(45) Date of Patent: Jul. 7, 2026

(54) EXTENDED AR DISPLAY

(71) Applicant: Adeia Guides Inc., San Jose, CA (US)

(72) Inventors: Christopher Phillips, Hartwell, GA (US); Dhananjay Lal, Englewood, CO (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 119 days.

(21) Appl. No.: 18/371,254

(22) Filed: Sep. 21, 2023

(65) Prior Publication Data

US 2025/0104361 A1    Mar. 27, 2025

(51) Int. Cl.
| | |
|---|---|
| *G06T 19/00* | (2011.01) |
| *G06F 3/01* | (2006.01) |
| *G06F 3/04812* | (2022.01) |
| *G06F 3/04845* | (2022.01) |
| *G06F 3/14* | (2006.01) |

(52) U.S. Cl.
CPC ............ *G06T 19/006* (2013.01); *G06F 3/012* (2013.01); *G06F 3/013* (2013.01); *G06F 3/04812* (2013.01); *G06F 3/04845* (2013.01); *G06F 3/1431* (2013.01)

(58) Field of Classification Search
CPC ....... G06T 19/006; G06F 3/012; G06F 3/013; G06F 3/04812; G06F 3/04845; G06F 3/1431; G06F 3/011
See application file for complete search history.

(56) References Cited

U.S. PATENT DOCUMENTS

| | | | |
|---|---|---|---|
| 8,994,721 | B2 | 3/2015 | Matsuda |
| 9,066,154 | B2 | 6/2015 | Simpson et al. |
| 9,100,464 | B2 | 8/2015 | Dasher et al. |
| 9,374,549 | B2 | 6/2016 | Cho |

(Continued)

FOREIGN PATENT DOCUMENTS

| | | |
|---|---|---|
| CN | 116501279 A | 7/2023 |
| EP | 3667455 A1 | 6/2020 |

(Continued)

OTHER PUBLICATIONS

Mcgill et al., "Expanding the Bounds of Seated Virtual Workspaces", ACM Transactions on Computer-Human Interaction, ACM, New York, NY, US, vol. 27, No. 3, May 31, 2020, pp. 1-40.

(Continued)

*Primary Examiner* — Jeffery A Brier
(74) *Attorney, Agent, or Firm* — HG LAW LLP

(57) ABSTRACT

A virtual display visible via extended reality equipment (XR equipment) is controlled by user input to a physical controller that also controls a physical display. The physical controller may be a keyboard, a trackpad, a mouse, a joystick, a gaming controller, gaming console, or an appliance remote controller. The virtual display may be generated by a movement of a graphical user interface element on the physical display beyond a display area of the physical display or in other ways. The virtual display may be anchored to the physical display so as to move in response to movement of the physical device. A second virtual display may be similarly generated in response to further user input via the physical device and may be automatically positioned so as to be visible via the XR equipment on a same vertical plane or arc as the first virtual display.

20 Claims, 35 Drawing Sheets

(56) References Cited

U.S. PATENT DOCUMENTS

| | | | |
|---|---|---|---|
| 9,632,648 | B2 | 4/2017 | Lee et al. |
| 9,716,861 | B1 | 7/2017 | Poel et al. |
| 9,830,680 | B2 | 11/2017 | Meuninck et al. |
| 9,996,150 | B2 | 6/2018 | Swaminathan et al. |
| 10,289,290 | B2 | 5/2019 | Gil |
| 10,440,416 | B1 | 10/2019 | Phillips et al. |
| 10,453,263 | B2 | 10/2019 | Khalid et al. |
| 10,528,210 | B2 | 1/2020 | Reeves et al. |
| 10,591,730 | B2 | 3/2020 | Rodriguez |
| 10,754,496 | B2 | 8/2020 | Kiemele et al. |
| 10,871,934 | B2 | 12/2020 | Paulovich et al. |
| 10,922,892 | B1 | 2/2021 | Bhushan et al. |
| 11,082,679 | B1 | 8/2021 | Swift et al. |
| 11,086,392 | B1 | 8/2021 | Sztuk et al. |
| 11,200,869 | B1 | 12/2021 | Post et al. |
| 11,385,775 | B2 | 7/2022 | Singh et al. |
| 11,386,611 | B2 | 7/2022 | Newman et al. |
| 11,630,509 | B2 | 4/2023 | Lee et al. |
| 11,816,494 | B2 | 11/2023 | Huang |
| 11,979,630 | B2 | 5/2024 | Sharma et al. |
| 2008/0115081 | A1 | 5/2008 | Sankaravadivelu et al. |
| 2010/0211872 | A1 | 8/2010 | Rolston et al. |
| 2010/0251292 | A1 | 9/2010 | Srinivasan et al. |
| 2011/0164175 | A1 | 7/2011 | Chung et al. |
| 2012/0154557 | A1 | 6/2012 | Perez et al. |
| 2012/0304092 | A1 | 11/2012 | Jarrett et al. |
| 2013/0027613 | A1 | 1/2013 | Kim et al. |
| 2013/0031582 | A1 | 1/2013 | Tinsman et al. |
| 2013/0036442 | A1 | 2/2013 | Wingert |
| 2013/0173765 | A1 | 7/2013 | Korbecki |
| 2014/0029913 | A1 | 1/2014 | Lopez et al. |
| 2014/0068692 | A1 | 3/2014 | Archibong et al. |
| 2014/0168262 | A1 | 6/2014 | Forutanpour et al. |
| 2014/0223490 | A1 | 8/2014 | Pan et al. |
| 2014/0282272 | A1 | 9/2014 | Kies et al. |
| 2014/0351729 | A1 | 11/2014 | Park |
| 2015/0007225 | A1 | 1/2015 | Strong |
| 2015/0312561 | A1 | 10/2015 | Hoof et al. |
| 2015/0317062 | A1 | 11/2015 | Jarrett et al. |
| 2016/0034155 | A1 | 2/2016 | Vranjes et al. |
| 2016/0054791 | A1 | 2/2016 | Mullins et al. |
| 2016/0267712 | A1 | 9/2016 | Nartker et al. |
| 2017/0185276 | A1 | 6/2017 | Lee et al. |
| 2017/0201808 | A1 | 7/2017 | Chowdhary et al. |
| 2017/0256096 | A1 | 9/2017 | Faaborg et al. |
| 2018/0070113 | A1 | 3/2018 | Phillips et al. |
| 2018/0173323 | A1 | 6/2018 | Harvey et al. |
| 2018/0204362 | A1 | 7/2018 | Tinsman |
| 2018/0376205 | A1 | 12/2018 | Oswal et al. |
| 2019/0065026 | A1 | 2/2019 | Kiemele et al. |
| 2019/0146219 | A1 | 5/2019 | Rodriguez |
| 2019/0279407 | A1 | 9/2019 | Mchugh et al. |
| 2019/0356939 | A1 | 11/2019 | Kuo |
| 2020/0035003 | A1 | 1/2020 | Canberk et al. |
| 2020/0111232 | A1 | 4/2020 | Bleyer et al. |
| 2021/0037279 | A1 | 2/2021 | Moran et al. |
| 2021/0072877 | A1 | 3/2021 | Kim et al. |
| 2021/0152876 | A1 | 5/2021 | Feng |
| 2021/0383115 | A1 | 12/2021 | Alon et al. |
| 2021/0397000 | A1 | 12/2021 | Rodriguez |
| 2022/0092860 | A1 | 3/2022 | Clark et al. |
| 2022/0100265 | A1 | 3/2022 | Kies et al. |
| 2022/0229534 | A1 * | 7/2022 | Terre ................... G06F 3/04815 |
| 2022/0244903 | A1 | 8/2022 | Taylor et al. |
| 2022/0253093 | A1 * | 8/2022 | Berliner ............... G06F 3/0233 |
| 2022/0253125 | A1 | 8/2022 | Wallen et al. |
| 2022/0292785 | A1 | 9/2022 | Jayaram et al. |
| 2022/0295040 | A1 | 9/2022 | Jayaram et al. |
| 2022/0326967 | A1 | 10/2022 | Khan et al. |
| 2022/0334649 | A1 | 10/2022 | Hwang et al. |
| 2022/0334695 | A1 | 10/2022 | Singh et al. |
| 2022/0392170 | A1 | 12/2022 | Singh |
| 2023/0031023 | A1 | 2/2023 | Wang et al. |
| 2023/0067584 | A1 | 3/2023 | Zhou |
| 2023/0095339 | A1 | 3/2023 | Cleland-Huang et al. |
| 2023/0130770 | A1 | 4/2023 | Miller et al. |
| 2023/0137920 | A1 | 5/2023 | Klein et al. |
| 2023/0171456 | A1 | 6/2023 | Sharma et al. |
| 2023/0186528 | A1 | 6/2023 | Eluvan et al. |
| 2023/0237752 | A1 | 7/2023 | Elhadad et al. |
| 2023/0260240 | A1 | 8/2023 | Jayaram et al. |
| 2024/0005613 | A1 * | 1/2024 | Leyton ............... G02B 27/0172 |
| 2024/0211090 | A1 | 6/2024 | Dasher et al. |
| 2024/0244285 | A1 | 7/2024 | Gurgul et al. |
| 2024/0248544 | A1 | 7/2024 | Liu |
| 2024/0361833 | A1 * | 10/2024 | Calderone ............... G06F 3/013 |
| 2024/0430501 | A1 | 12/2024 | Phillips |
| 2025/0138695 | A1 | 5/2025 | Lal et al. |
| 2025/0139909 | A1 | 5/2025 | Lal et al. |
| 2025/0159275 | A1 | 5/2025 | Phillips et al. |

FOREIGN PATENT DOCUMENTS

| | | | | |
|---|---|---|---|---|
| EP | 3539087 | B1 | 11/2022 | |
| WO | WO-2017102636 | A1 * | 6/2017 | ............. B60K 35/00 |
| WO | 2018/090060 | A1 | 5/2018 | |
| WO | WO-2022103741 | A1 * | 5/2022 | ............. G06F 3/013 |

OTHER PUBLICATIONS

U.S. Appl. No. 18/214,119, filed Jun. 26, 2023, Christopher Phillips.

U.S. Appl. No. 18/088,067, filed Dec. 23, 2022, Charles Dasher.

U.S. Appl. No. 18/505,937, filed Nov. 9, 2023, Christopher Phillips.

U.S. Appl. No. 18/496,515, filed Oct. 27, 2023, Dhananjay Lal.

U.S. Appl. No. 18/496,528, filed Oct. 27, 2023, Dhananjay Lal.

International Search Report and Written Opinion received for PCT Patent Application No. PCT/US2023/085672, mailed on May 6, 2024, 15 pages.

Monica Chin, "I used the world's first augmented reality laptop" (May 18, 2023)(https://www.theverge.com/23727583/spacetop-augmented-reality-laptop-release-hands-on), (5 pages).

Munson, Ben , "AT&T and Magic Leap will let you watch 4 shows at a time", Munson, Ben, "AT&T and Magic Leap will let you watch 4 shows at a time," StreamTV Insider, (Oct. 10, 2018).

* cited by examiner

Physical Device Remote Command Forwarding

131 Virtual window

132 Panel

111 Physical Display

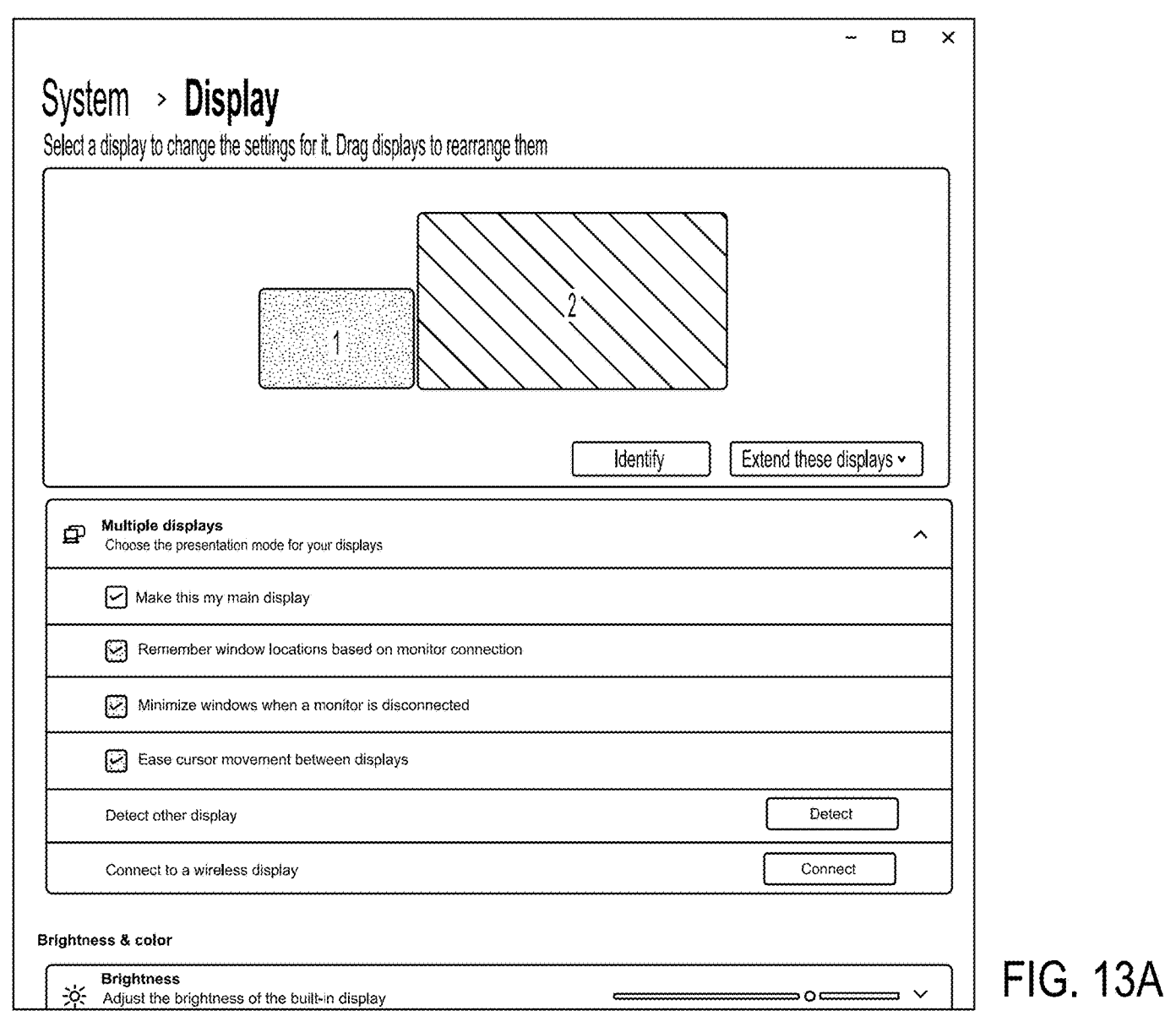

System › Display

Select a display to change the settings for it. Drag displays to rearrange them

2

1

Identify    Extend these displays ˅

🖵 Multiple displays
Choose the presentation mode for your displays

☑ Make this my main display

☑ Remember window locations based on monitor connection

☑ Minimize windows when a monitor is disconnected

☑ Ease cursor movement between displays

Detect other display          Detect

Connect to a wireless display          Connect

Brightness & color

☀ Brightness
Adjust the brightness of the built-in display

FIG. 13A

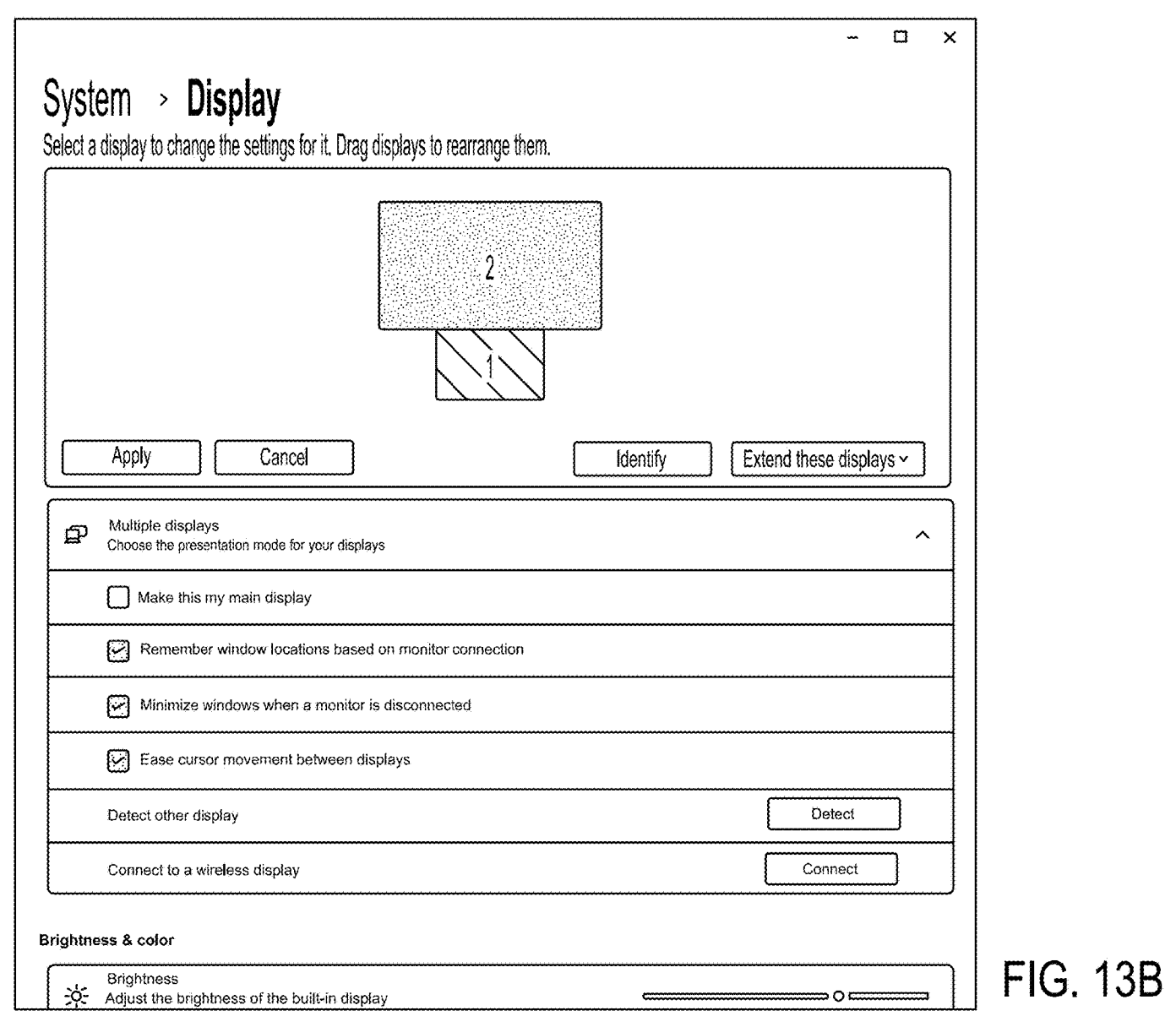

System › Display

Select a display to change the settings for it. Drag displays to rearrange them.

| 2 |
| 1 |

Identify     Extend these displays ⌄

Apply     Cancel

⌃

▢ Multiple displays
Choose the presentation mode for your displays

☐ Make this my main display

☑ Remember window locations based on monitor connection

☑ Minimize windows when a monitor is disconnected

☑ Ease cursor movement between displays

Detect other display     Detect

Connect to a wireless display     Connect

Brightness & color

☀ Brightness
Adjust the brightness of the built-in display

FIG. 13B

Virtual Extended Display 125

Virtual Extended Display 123

Virtual Extended Display 121

111 Primary Physical Display

103

XR Equipment 1711

EXTENDED AR DISPLAY

BACKGROUND

The present disclosure relates to extended reality (XR) displays, for example, augmented reality (AR) displays and, in particular, relates to controlling such virtual displays together with physical displays using a physical controller.

SUMMARY

A technological problem that arises from the use of digital displays, including computer monitors, tablet and other handheld and portable displays, gaming displays, televisions, and the like is the limited size, financial cost, and physical resources necessary to produce physical display "real estate" available for viewing. More than one application or instance of an application may be needed by users of physical displays at any given time and users may need or desire to view and to interact with each such application or instance of an application.

According to one approach, a virtual display may be used to extend a viewing area of a physical display, or a virtual display may serve as a separate additional display. However, XR equipment, such as a head mounted displays (HMDs), smart glasses, and the like, then needs to be used for controlling such displays, which may then result in a situation in which a user uses the physical controller of the physical display, such as a keyboard, trackpad, mouse, joystick or other gaming console controls, TV/household appliance remote control, handheld device, or the like, or combination thereof, to control the physical display, but has to switch to gestures or to the handheld controllers of the XR equipment to control the virtual display. Such switching may result in slower work and response times, redundancy of equipment, and confusion.

In addition, XR equipment may lack the specific functionality needed to control applications visible on the virtual displays. For example, XR equipment may lack the fine controls of a physical keyboard and mouse to control a spreadsheet application or a word processing application displayed on a virtual display, or may force novel or unexpected ways of interaction to control the application displayed on the virtual display.

Another approach to this problem is to create multiple virtual displays, in the absence of a physical display. A physical controller, such as a keyboard and mouse, may be designed for input to the virtual displays.

However, users often want the convenience of a physical display, for example, due to its high fidelity, size, familiarity, and the like, controlled by familiar input devices, such as keyboard and mouse, but at the same time may want to augment their physical display with one or more virtual displays around the physical display.

A technological solution to these and other technological problems, according to an aspect of the disclosure, is creating a virtual display by interacting with user interface elements of applications displayed on the physical display. For example, a window, panel or other graphical user interface element displaying or representing an application on the physical display may be dragged off of the graphical user interface area of the physical display, using the physical controls used to control the physical display, to generate a new virtual display viewable on XR equipment. The new virtual display may then be controlled using the physical controls that are also used to control the physical display. In this way, according to this approach, the user may seamlessly control both the physical display and the virtual display using the same physical equipment. For example, three virtual displays may be automatically positioned to be seen on a semicircular arc, or approximately semicircular arc, or three displays may be positioned such that the middle display has a different Z-depth with respect to the user sitting in front of the central display, than the Z-depth of the side displays.

In an embodiment, more than one such virtual displays may be organized to be seen in the same virtual plane or along the same virtual arc, which may be the same virtual plane or arc as the one in which the physical display is located. The virtual displays may be anchored to the physical display so that they move in response to movement, for example, in response to a change of angle of the position of the physical display. In this way, the same viewing relationship may be maintained for the physical and virtual displays from the perspective of the user.

A method, system, non-transitory computer-readable medium, and means for implementing the method are disclosed for controlling a physical display in response to a first user input received via a physical controller logically connected to the physical display. In this method, a first virtual display in response to a second user input via the physical controller is generated such that the first virtual display is visible via XR equipment different from the physical display; and the first virtual display is controlled based on a third user input received via the physical controller.

For example, the physical controller may be one or more of a keyboard, a trackpad, a mouse, a joystick, a gaming controller, gaming console, or an appliance remote controller. The second user input may be, for example, a movement of a graphical user interface element of the physical display beyond a graphical user interface display area of the physical display. In addition, a second virtual display may be generated in response to a further user input. The second virtual display may be positioned so as to be visible via the XR HMD on a same virtual plane as the first virtual display.

A position of the first virtual display may be moved in relation to the physical display in response to receiving, via the physical controller, a position change user input. By way of further example, the first virtual display may be moved to a second position in response to a detection of a movement of the physical display, such that the position of the first virtual display in relation to the position of the physical display remains unchanged.

The first virtual display may be set as a display of focus in response to receiving a user input via the XR HMD. For example, the user input may be a head movement and/or an eye movement. In this way, in response to the selecting of the first virtual display as the display of focus, the first virtual display may be controlled based on additional user input received via the physical controller. Once the first virtual display is set as the display of focus, it may be repositioned to a more prominent location in relation to the physical display or in relation to the XR HMD position, or may be enlarged, colored or otherwise highlighted. Instead or in addition, the first virtual display may be selected as a display of focus in response to receiving, via the physical controller, a user input repositioning a cursor. In response to the selecting of the first virtual display as the display of focus, it may be controlled in response to further output of the application based on further user input received via the physical controller. A cursor movement off a user interface area of the active virtual (the one with focus) may be prevented until a further user focus input selects another display as the display of focus, or until a special user input commands cursor movement off the display of focus. In response to user selection of another display as the display of focus, a previous cursor position on the user interface area of the other display may be resumed from a previous cursor position on that other display.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 10-12B illustrate an example of a process for generating a virtual panel using a gaming controller, according to an aspect of the disclosure;

FIGS. 13A-13B illustrate examples of setting display positions relative to each other;

DETAILED DESCRIPTION

Figure 1:
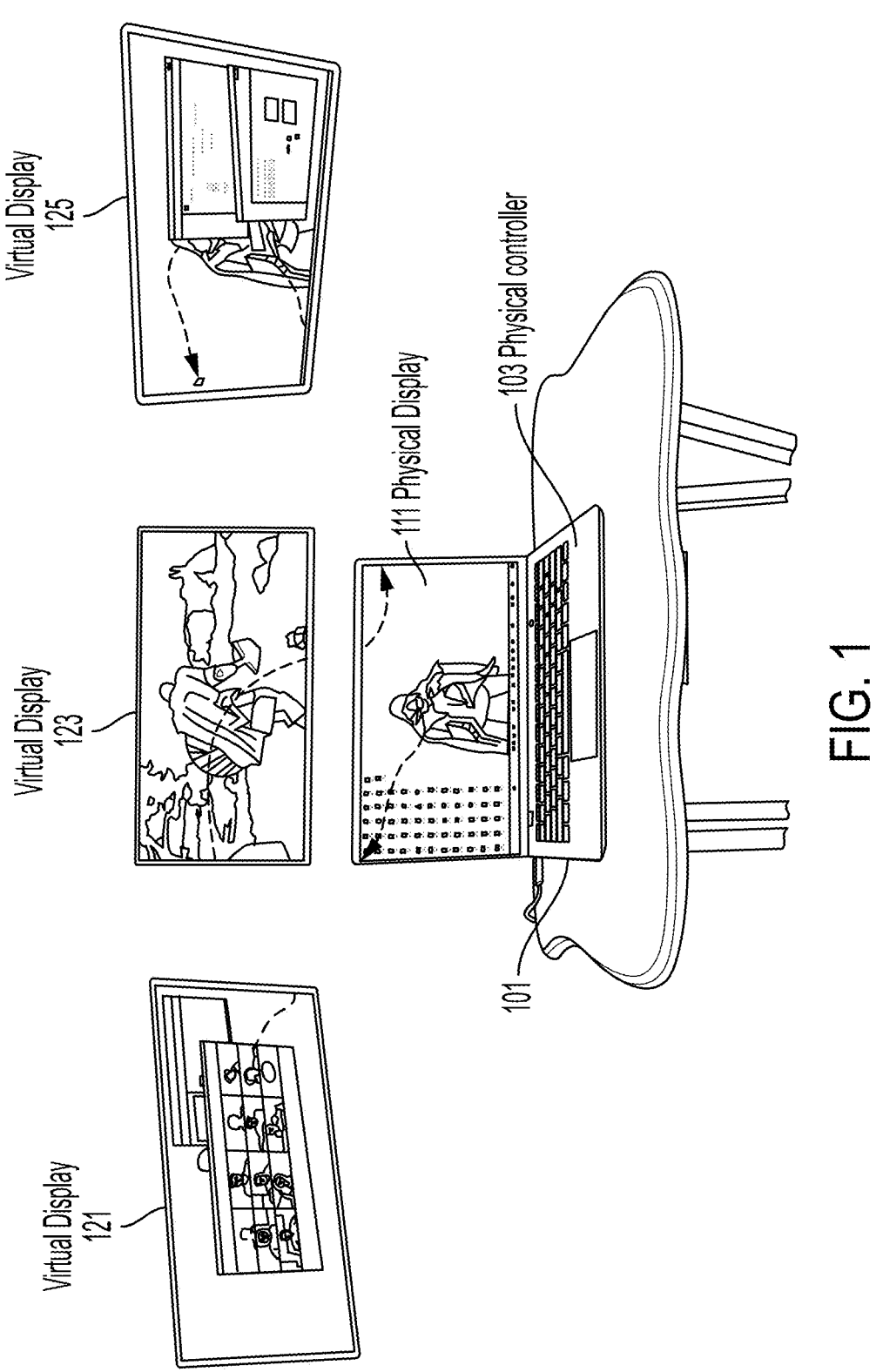
FIG. 1 illustrates an example of a physical device, including an integrated physical keyboard and trackpad (physical controller) and a physical laptop monitor (physical display), and three virtual displays that may be rendered on right and left eye displays of an XR HMD or other XR equipment, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

References herein to an "XR device" refer to a device providing virtual reality (VR), mixed or merged reality (MR), or augmented reality (AR) functionality (e.g., wherein virtual objects or graphic overlays are provided in addition to real-world objects or environments visible via the device). The terms AR and MR may sometimes be used interchangeable with XR herein. An XR device may take the form of glasses or a headset in some instances (e.g., a head-mounted display or HMD). While some references are made to a VR device or devices, appreciate that some or all of the described techniques may be implemented with respect to any suitable XR device (e.g., an XR device that provides an MR or AR scene that is partially or wholly populated by virtual objects). For example, some or all of a real-world environment may be visible via XR devices of multiple users, and the users may generate reconfigured safe areas and a virtual partition for their XR devices utilizing the techniques discussed herein. In some embodiments, the described XR or VR devices may include see-through capabilities enabling the display of some or all of a user's real-world environment. For example, the device 111 may include optical see-through (OST) capability in which light passes through the display, providing "through the glass" visibility of an environment. In an embodiment, the device 111 may include video see-through (VST) capability, wherein cameras (e.g., mounted on or within the device 111) capture images or video of the user's environment and render a corresponding video, allowing the user to view, in whole or in part, his or her real-world environment by way of the video.

The term "virtual display" may include a display perceptible by an XR device, such as an AR or MR device. In some embodiments, the device 111 may be any suitable XR device configured to display virtual objects within a scene including any suitable combination of a real-world environment, a virtual environment, and/or virtual objects. It may be determined whether the XR device is connected to Wi-Fi and the Internet. If it is not connected to a network, then network connectivity is obtained. In an embodiment, the XR devices are connected using the same Wi-Fi network to facilitate integrated use.

FIG. 1 illustrates an example of virtual displays 121, 123 and 125 controlled by physical controller 103 of physical device 101, which may also control the physical display 111. Three virtual displays are shown, but it will be understood that more or fewer virtual displays may be provided. Also, virtual displays may overlap each other and/or overlap physical display 111 so as to provide larger viewing areas. FIG. 1 shows that virtual displays 121, 123, 125 may be positioned along an arc, or substantial arc, which may be the same arc or substantial arc along which physical display 111 is positioned. The virtual displays may also be provided positioned along a vertical plane. In addition, one or more of virtual displays 121, 123 and 125 may be slightly tilted relative to the vertical plane or relative to the arc so that viewing by a user at physical controller 103 may be facilitated. The system may at time of virtual display generation automatically position the virtual displays along such an arc or vertical plane.

As also shown in FIG. 1, the XR displays 121, 123, 125 may be displaying output of different applications or different instances of the same application, or they may display output of the same application, for example, different portions of a window output by the same application. Physical controller 103 of physical device 101 may control physical display 111 and also the applications whose outputs are provided on virtual displays 121, 123 and 125 may be run locally in the physical device 101. Physical display 111 may be formed integrally with physical device 101 or may be connected via wired or wireless connection thereto.

Physical device 101 may be connected directly via wired wireless connection to extended reality head mounted display (XR HMD) for viewing virtual displays 121, 123 and 125. Physical Device 101 may be connected via server, such as a local area network (LAN) server or via the Internet to the XR HMD. While one XR HMD is sometimes referred, to it will be understood that more than one XR HMD may be provided. A virtual display 121, 123, 125 may be viewable by one or more XR HMDs. For example, more than one user may simultaneously use the system shown in FIG. 1. An XR HMD may render more than one virtual displays. The XR HMD may also provide audio output as part of the experience also provided by the relevant virtual display(s).

The XR HMD renders in each virtual display 121, 123, 125 whatever application output is generated by relevant applications run on the physical device 101 or run on servers as requested by the physical device 101.

In one embodiment, virtual extended displays may be automatically positioned in relation to the physical computing device (e.g., laptop). The position may be determined by the XR equipment such as an AR HMD or other AR display, and the XR HMD may be aware of the position of the physical device. As additional displays, physical or virtual, or additional virtual windows, are added, the arrangement of such displays and windows may automatically change. For example, three spatial displays may be arranged such that they form a straight line or placed along an arc.

Figure 2:
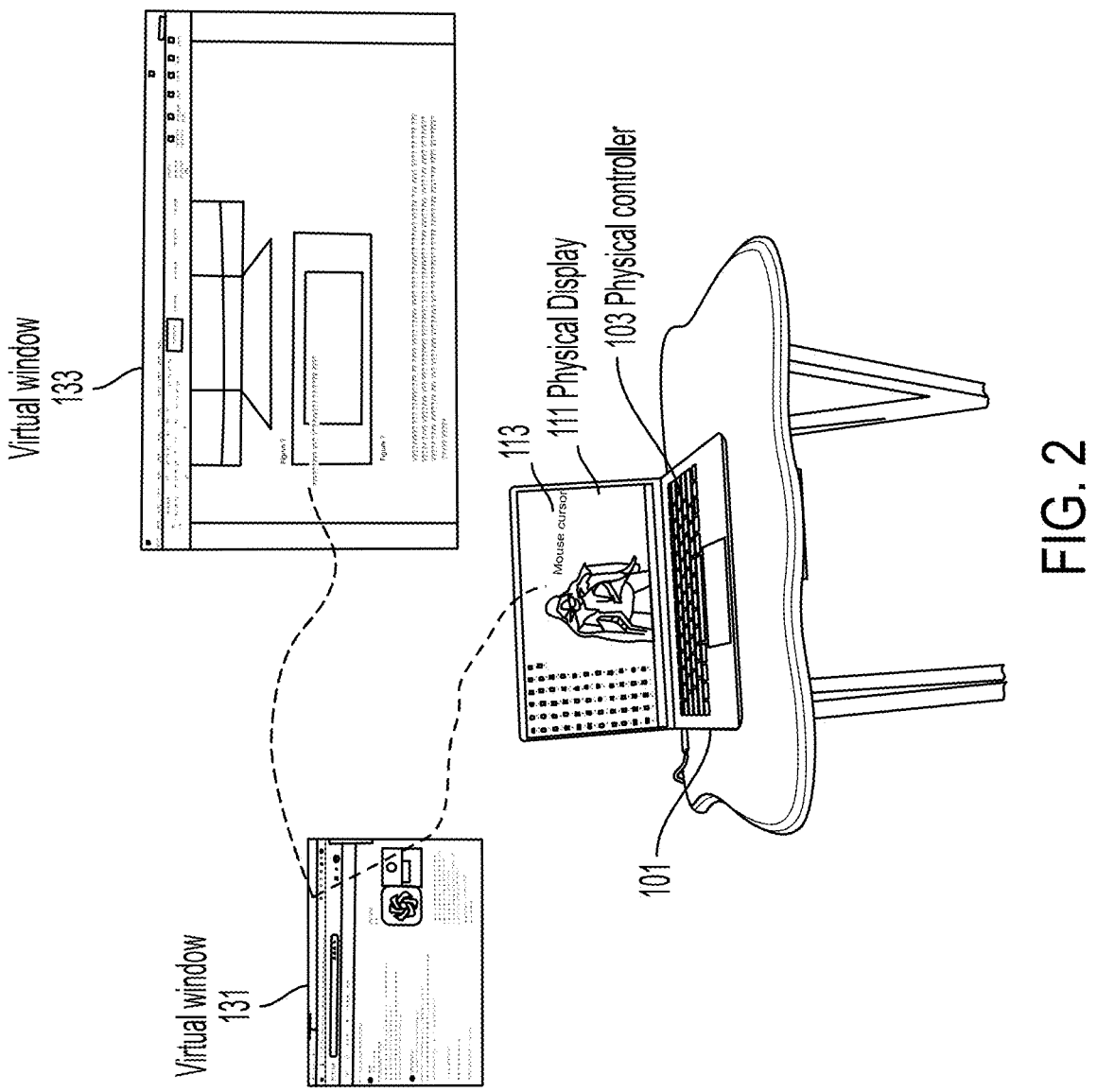
FIG. 2 illustrates an example of cursor tracking from the physical display to a first virtual application window and to a second virtual application window, according to an aspect of the disclosure.

FIG. 2 illustrates an example of navigating between the physical display 111 and virtual application windows 121, 123 using the physical controller 103. In an embodiment, a trackpad (or mouse, not shown) may be used to control movement of a cursor 113 between physical display 111, virtual application window 131 and virtual application window 133. Then, physical controller 103 would control the application associated with whichever virtual windows 131, 133 or physical display 111 to which the cursor has been moved. FIG. 2 also illustrates that the position of the cursor as it moves between the virtual windows 131, 133 may be visible to the user via the XR HMD 411.

In an embodiment, the size or color of the display or window that is given focus by the movement of the cursor may change to indicate that it is the one with focus. A virtual display or window with which the physical controller 103 is interacting may be automatically moved to a central location to align with the physical display 111 or may be made larger. The position of the cursor may also be rendered by the XR HMD.

The virtual windows may be anchored to a parent anchor, that is, to a region or zone in the physical space or to an object therein. For example, the virtual windows may be anchored to a table or to a chair such that movement of the table or chair, including a change of orientation of the table or chair, caused similar movement of the virtual windows. The zone may have its own coordinates in space and anchor all, or a subset, of the virtual windows. A virtual display may include more than one virtual window and/or other GUI widget. In an embodiment, virtual displays may be anchored to the physical device to allow the position of the virtual displays of the zone to change as a user changes the position of the laptop. Since the XR controller is aware of the laptop's physical display position, updating the laptop's physical display position auto-updates the position of the parent anchor, and thus updates the position of the virtual displays. In an embodiment, virtual displays and virtual windows may be anchored to the physical space and/or to an object therein. According to an embodiment, virtual displays and virtual windows may be anchored to the physical device. In a further embodiment, virtual displays and virtual windows may be anchored to the XR HMD 411. The term "virtual display" may sometimes be used herein and throughout the present application to refer to a virtual window and/or a virtual panel in addition to, or instead of, a virtual display.

Figure 3:
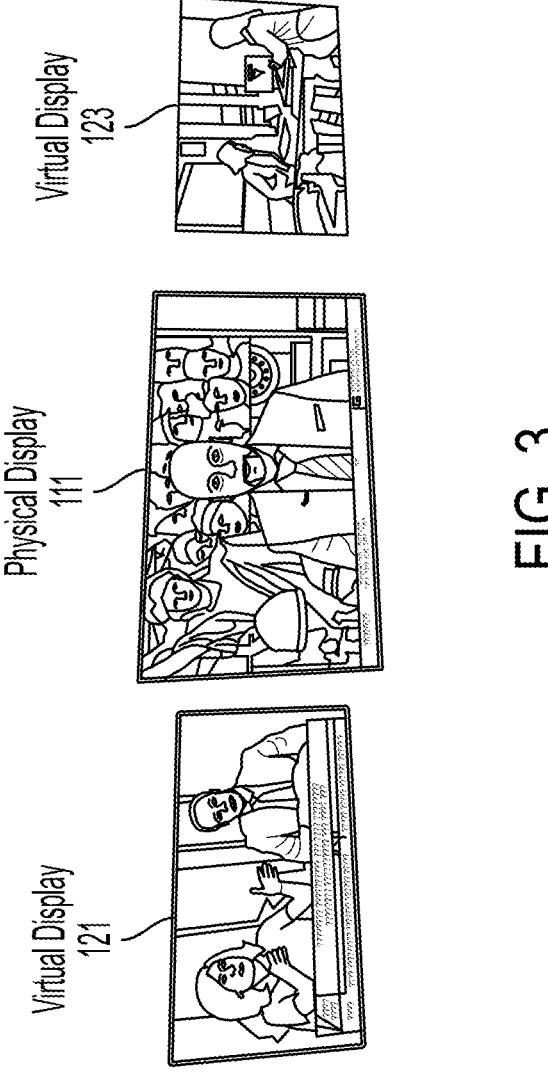
FIG. 3 illustrates a physical display, implemented as a television, and two virtual displays also showing video, according to an aspect of the disclosure.

FIG. 3 illustrates an embodiment in which television display 111 is accompanied by virtual displays 121 from 123 showing other television channels or other video. Physical display 111 of the television and virtual displays 121, 123 may be controlled, for example, using a television or household remote controller or smartphone. Physical display 111, virtual display 121 and virtual display 123 may be fed video by the same or different network router, server, DVD player, set-top box or the like.

Figure 4:
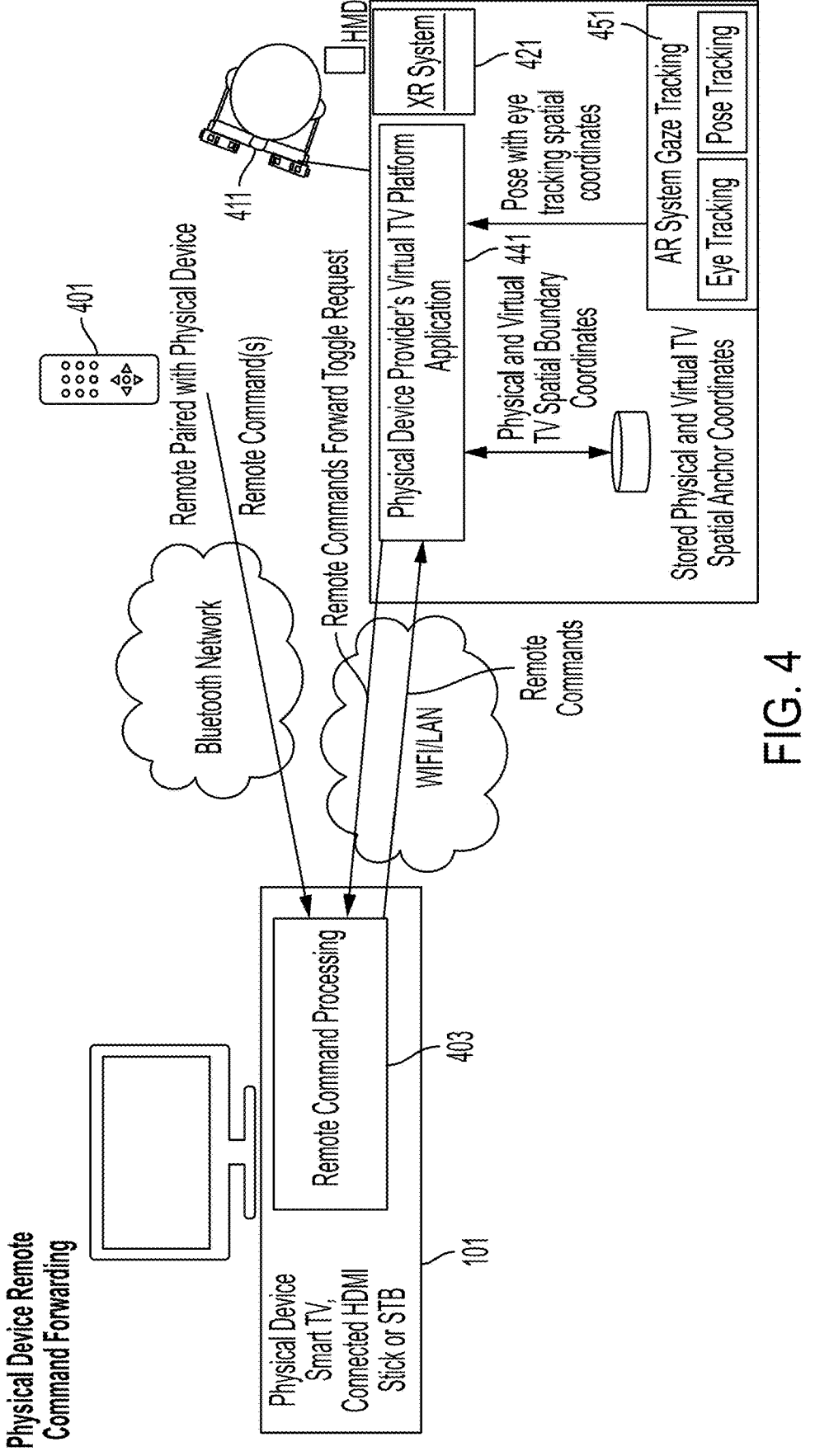
FIG. 4 is a schematic illustration of a system that includes a physical device, including a remote controller, a physical display, and hardware that includes a remote virtual display XR HMD or other XR equipment, shown as an AR (augmented reality) HMD, and an onboard or logically connected XR HMD control module that interfaces with the hardware of the physical device, according to an aspect of the disclosure.

FIG. 4 shows a system implementing physical device and virtual device integration. As shown in FIG. 4, physical device 101 may be a smart television connected via HDMI to an HDMI stick or set-top box or the like, and may include a remote command processing application or component 403 that communicates with a second physical device 401, shown by way of example as a television remote control device. Second physical device 401 may communicate with physical device 101 via Bluetooth or other short range radio frequency system, or via a local area network, such as a Wi-Fi network or the like. Commands entered via second physical device 401 may be transmitted via remote command processing 403 of the physical device 101 via a local area network or the Internet to an XR HMD or XR control function 421. XR system 421 may be connected a TV platform application 441 to XR HMD 411 or may be integrated therewith. XR system may include pose tracking and eye tracking of AR system gaze tracking 451, and may generate output to the video and audio systems of XR HMD 411 to display the virtual displays and provide audio.

Figure 5:
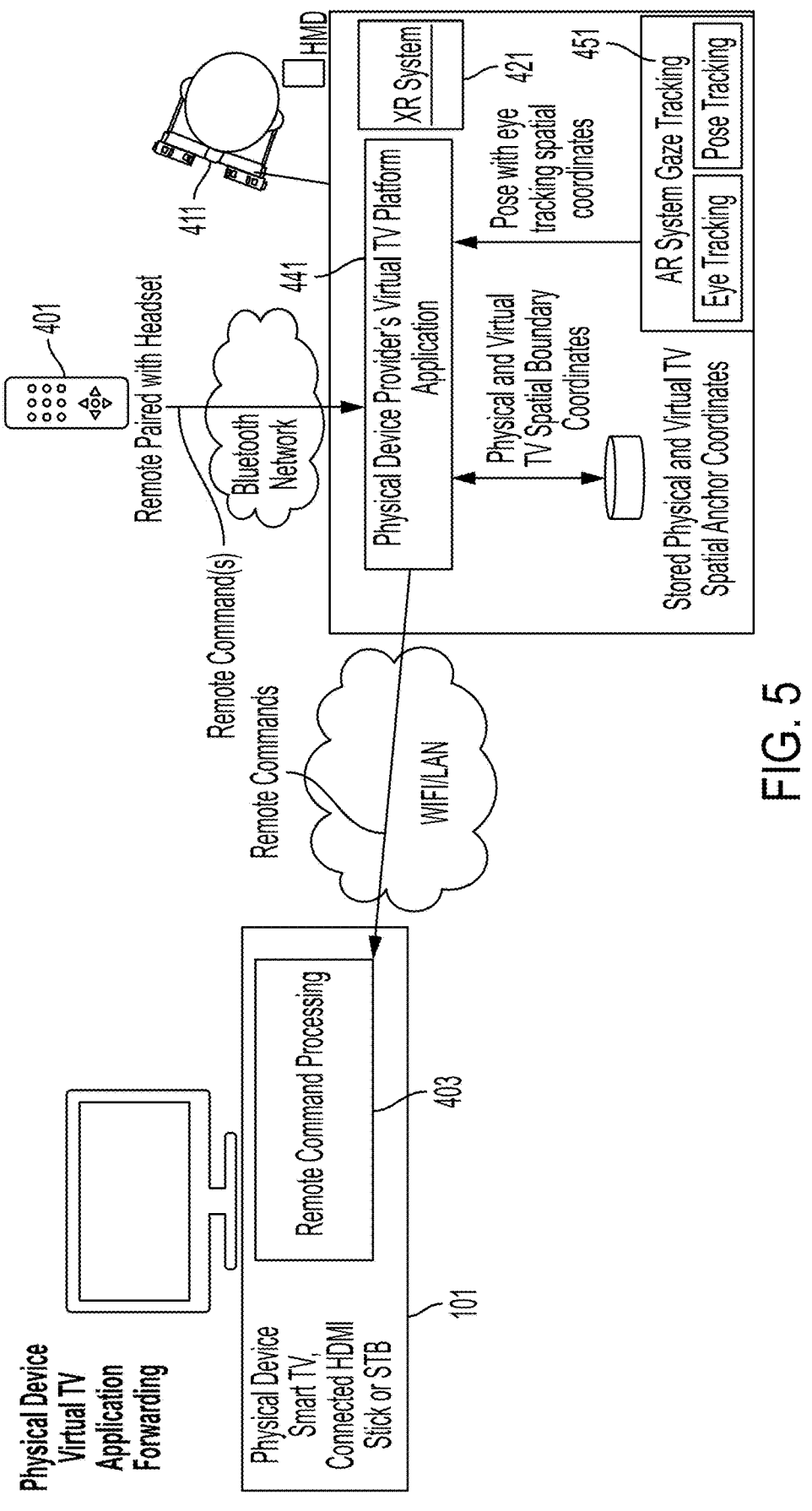
FIG. 5 is another schematic illustration of the system, showing the hardware of the physical device communicating via a data network, such as a local area network (LAN, for example, implemented by a wireless Wi-Fi router), with the remote control device interfacing directly with the XR HMD control module, according to an aspect of the disclosure.

FIG. 5 shows a system in which second physical device 401 communicates directly with XR system 421. Second physical device 401 communicates via Bluetooth or other close range radio communication system or via other means, for example, a local area network facilitated by a wireless router. User input entered via the second physical device 401 is thus sent to the XR system 421 to control the virtual or physical display that currently has focus, for example, as selected based on user gaze.

Figure 6:
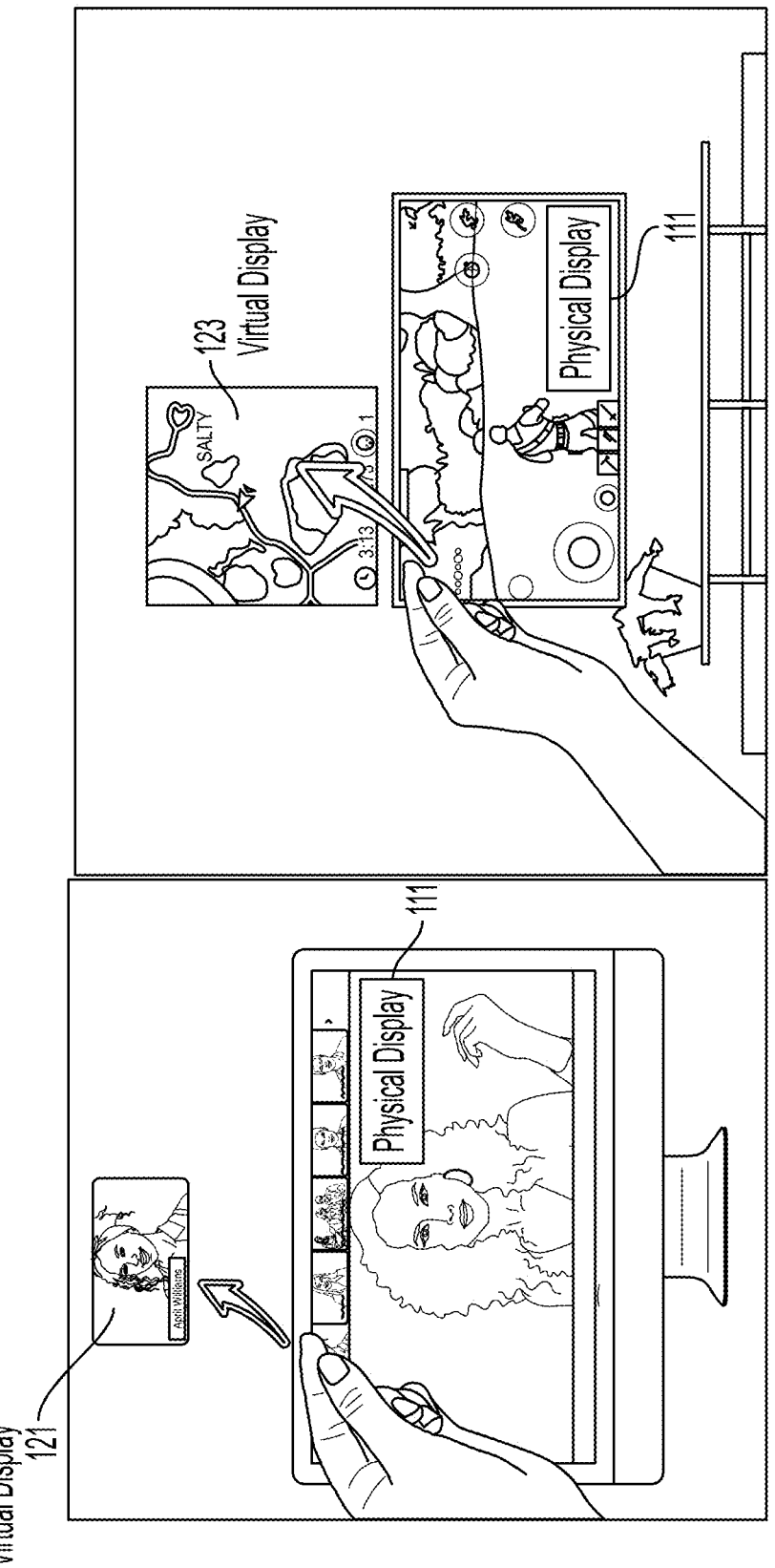
FIG. 6 illustrates examples of user hand gestures relayed to the system via cameras of the XR HMD.

FIG. 6 illustrates virtual displays 121 and 123 that may be controlled by user gestures using the HMD 411, according to one approach. For example, a user hand gesture may control what output of an application is displayed on the virtual display.

Figures 7A, 7B:
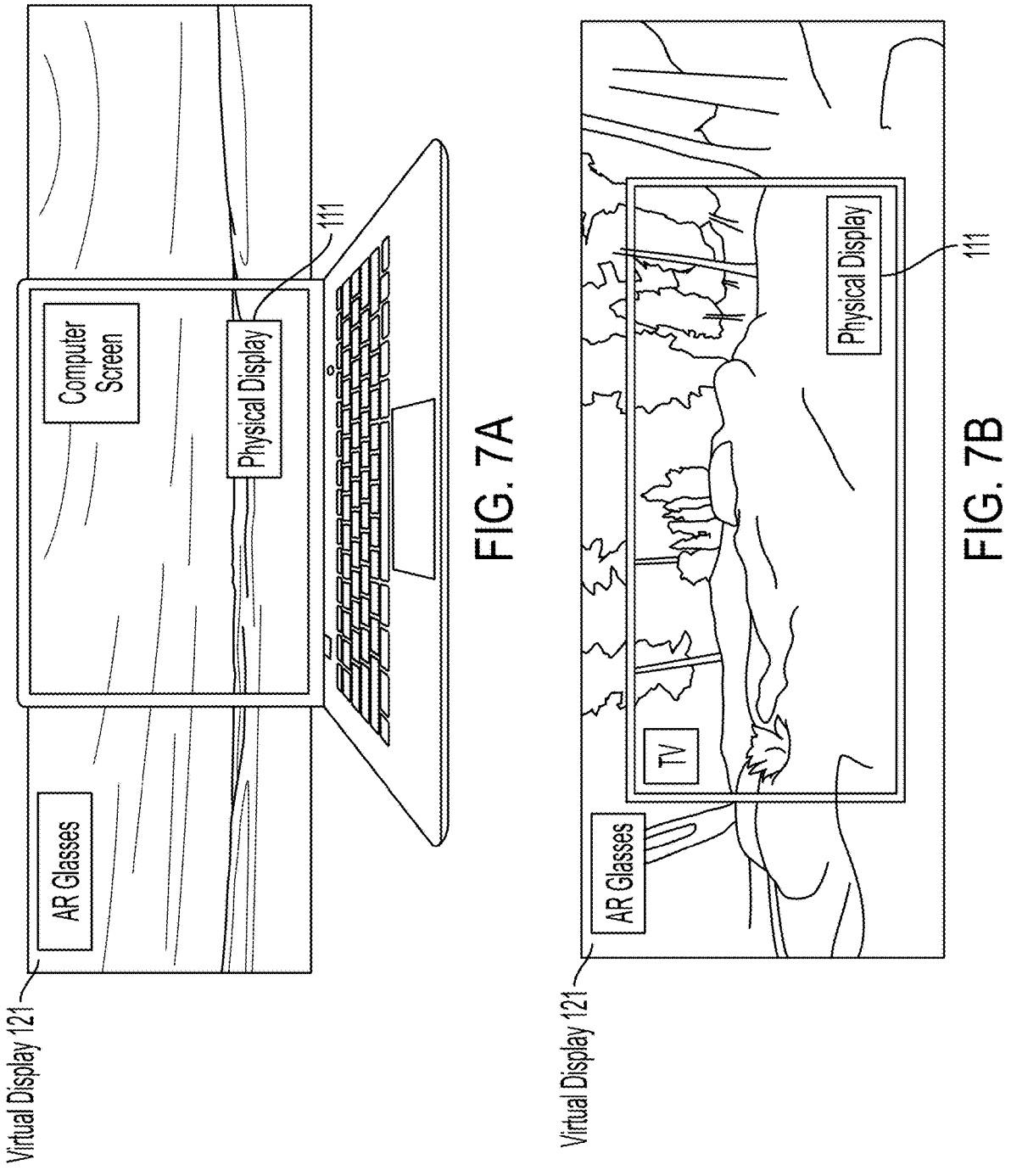
FIGS. 7A and 7B illustrate examples of over rendering on a physical display.

FIGS. 7A and 7B illustrate over rendering using a virtual display to supplement areas outside of the boundaries of the physical display. In this way, the viewing area provided by the physical display 111 may be enlarged. In an embodiment, the portions of the display rendered by the physical display and by the virtual display may be controlled in a manner as described herein.

Figure 8:
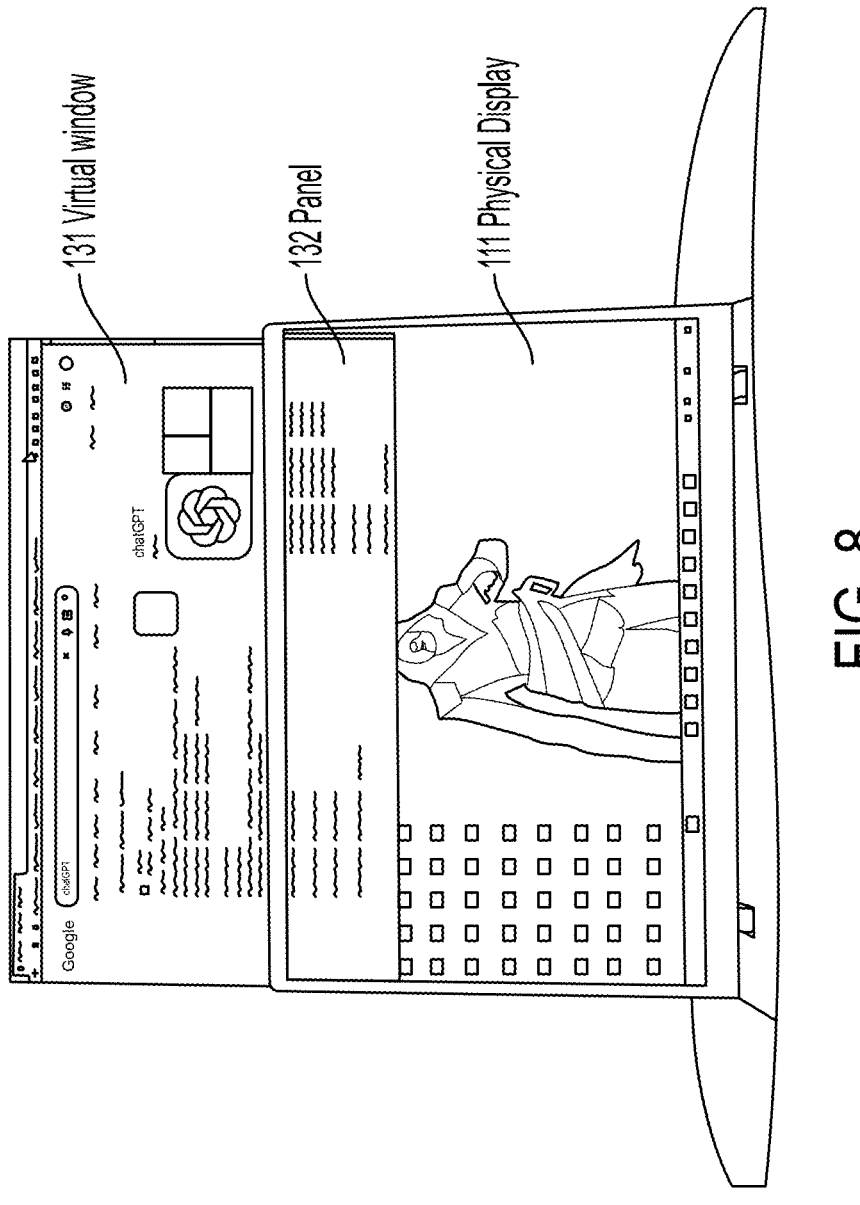
FIG. 8 illustrates creation of a virtual application window by the moving of an application window off the physical display, according to an aspect of the disclosure.

FIG. 8 illustrates a process of generating a virtual display 131 based on a graphical user element panel 132 that is displayed by the physical display 111. For example, panel 132 may be a window, panel or other GUI widget that is dragged using a trackpad, mouse or other control features of physical controller 103 to a position out of the boundaries of the GUI provided by physical display 111. In an embodiment, the physical device 101, or ancillary equipment logically connected thereto, may also recognize user gestures, such as hand or facial gestures, as well as voice or other types of commands or input.

Figure 9:
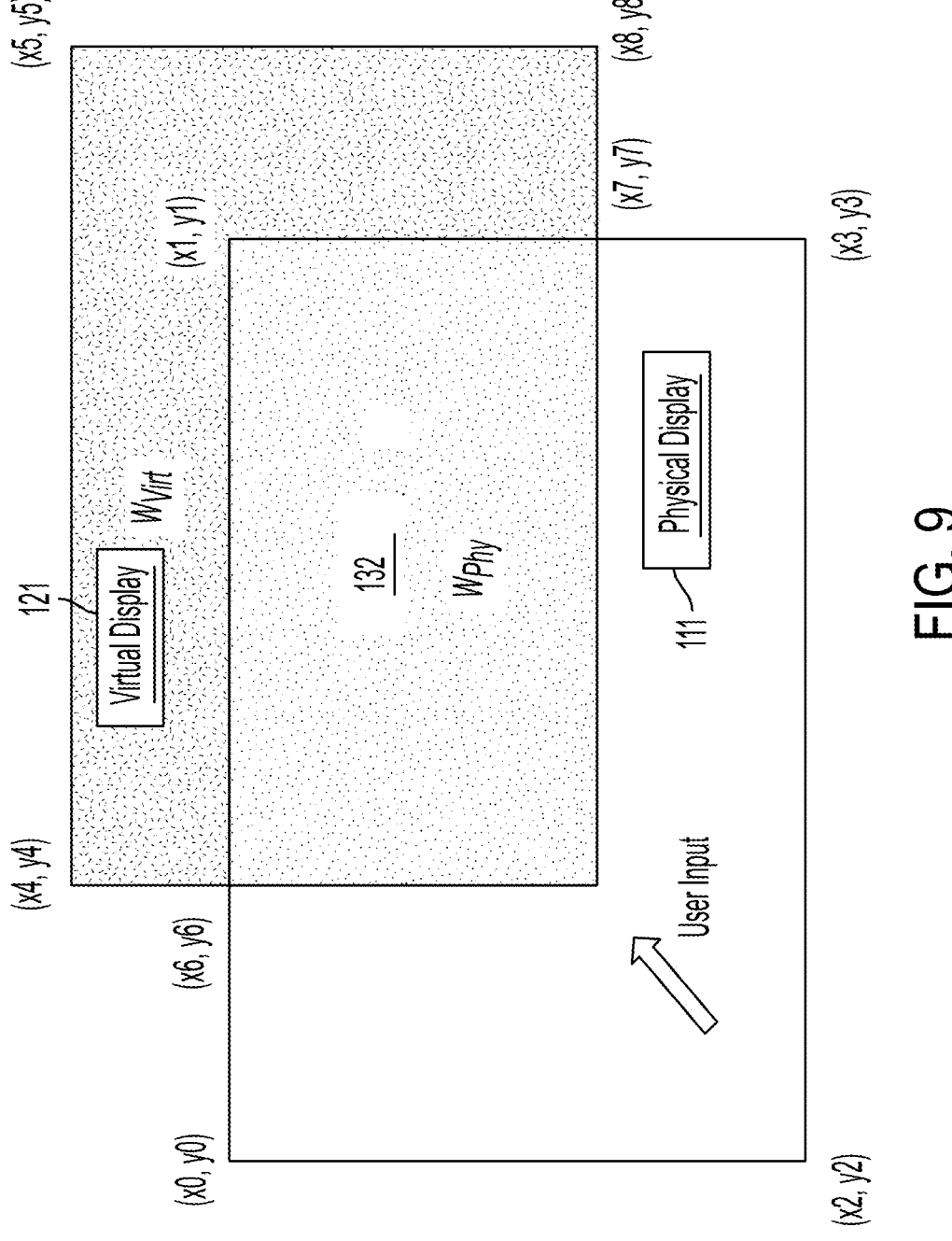
FIG. 9 is a schematic representation of a virtual display generated from and logically anchored to the physical display, according to an aspect of the disclosure.

FIG. 9 illustrates schematically the process of a GUI panel 132 being dragged off of the physical display 111. This process of "dragging" an application window from the physical display to the free space, such that it is partially rendered on the physical display and partially on the XR HMD as the fledgling virtual display. This illustration is shown on a 2D plane; a z-plane may be chosen by the system for rendering the virtual extended display. In some embodiments, this z-plane is calculated using computer vision/LiDAR etc. based on camera input captured at the XR HMD 411 to best represent the physical display (ex., z=0 or z=Z a constant represents the plane of the physical display). After a new virtual window or a virtual display is created, it may be moved farther or close along the Z-axis. In other embodiments, the z-plane is chosen based on considerations such as default setting, plane that minimizes vergence-accommodation conflict or the like. In an embodiment, a discontinuity/warping or other color change of the screen may be shown as it moves from the physical display.

Figure 10:
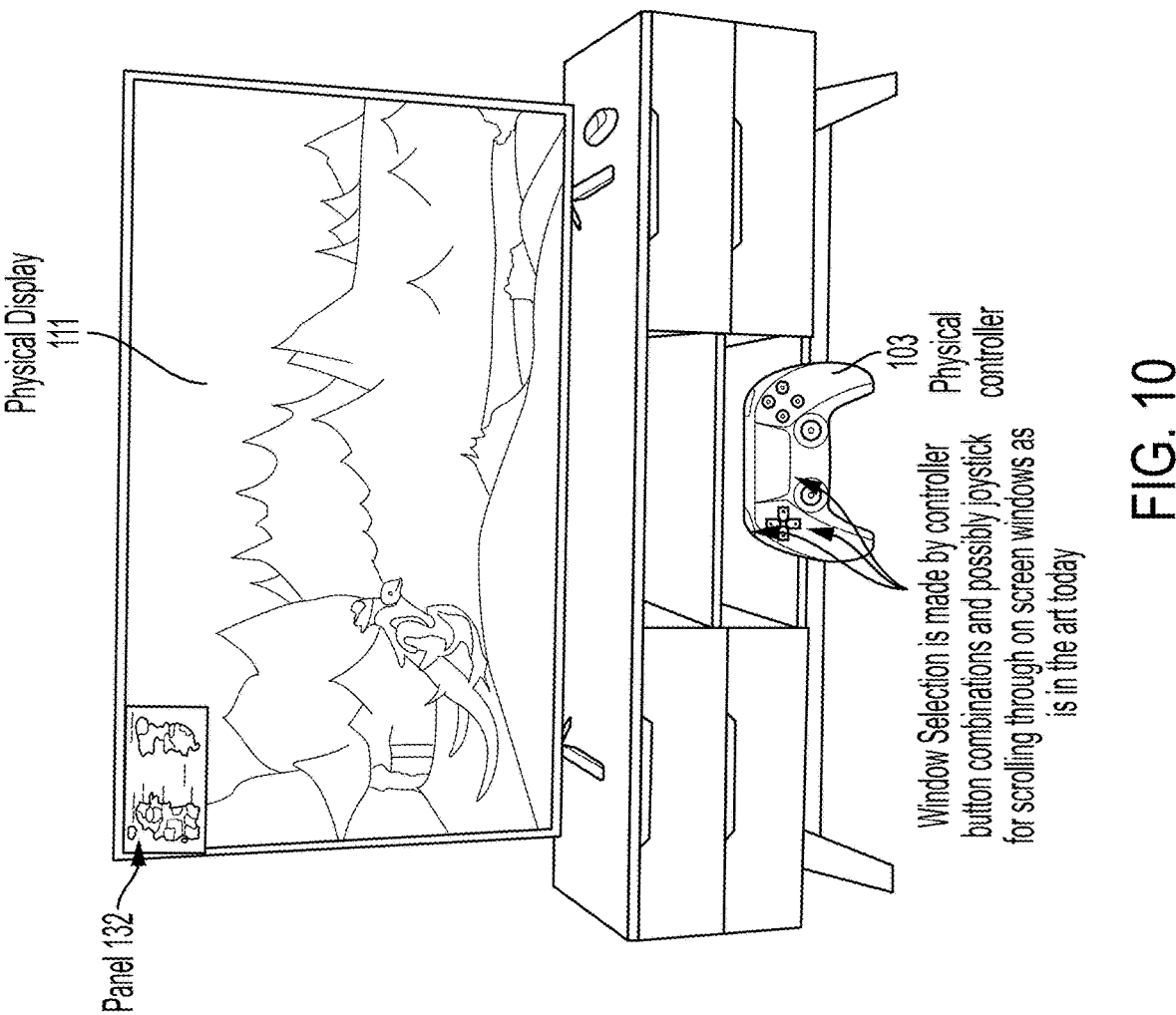

FIGS. 10-12B illustrate the generation of a virtual panel 132 as a panel or other graphical widget is dragged off physical display 111. As shown in FIG. 10, the panel 132 may be selected and dragged using a physical controller 103. The physical controller 103 may be a gaming console and the panel 132 may be selected and dragged using a combination of buttons and/or joystick. In contrast to the approach of FIG. 6, according to an embodiment illustrated in FIGS. 10-12B, the virtual panel 132 may be launched and controlled using the physical controls. The virtual panel 132 created as shown in FIGS. 10-12B may behave much like other virtual windows discussed herein or the virtual panel 132 may be anchored to the physical display 111.

Figures 11A, 11B:
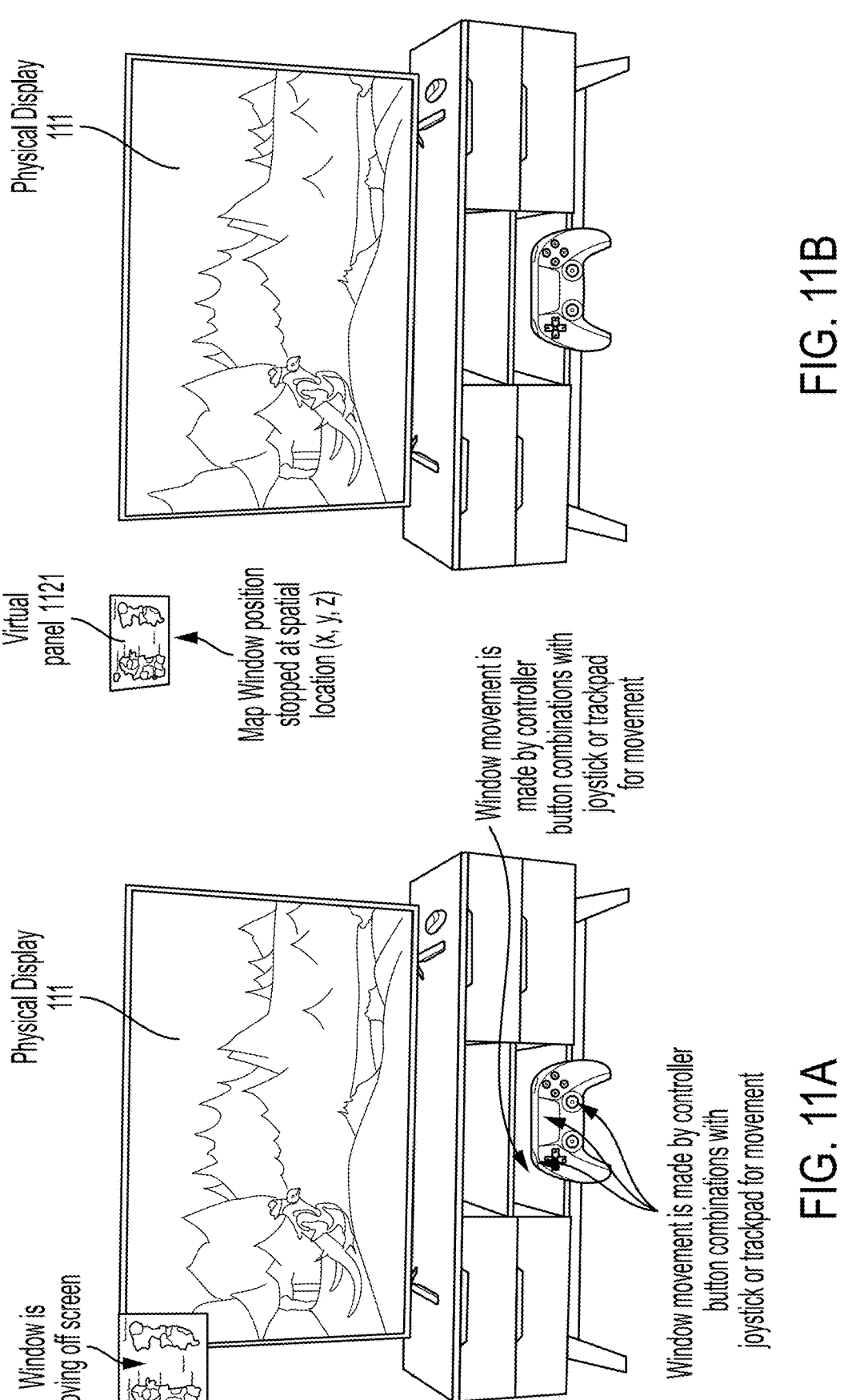
Figures 12A, 12B:
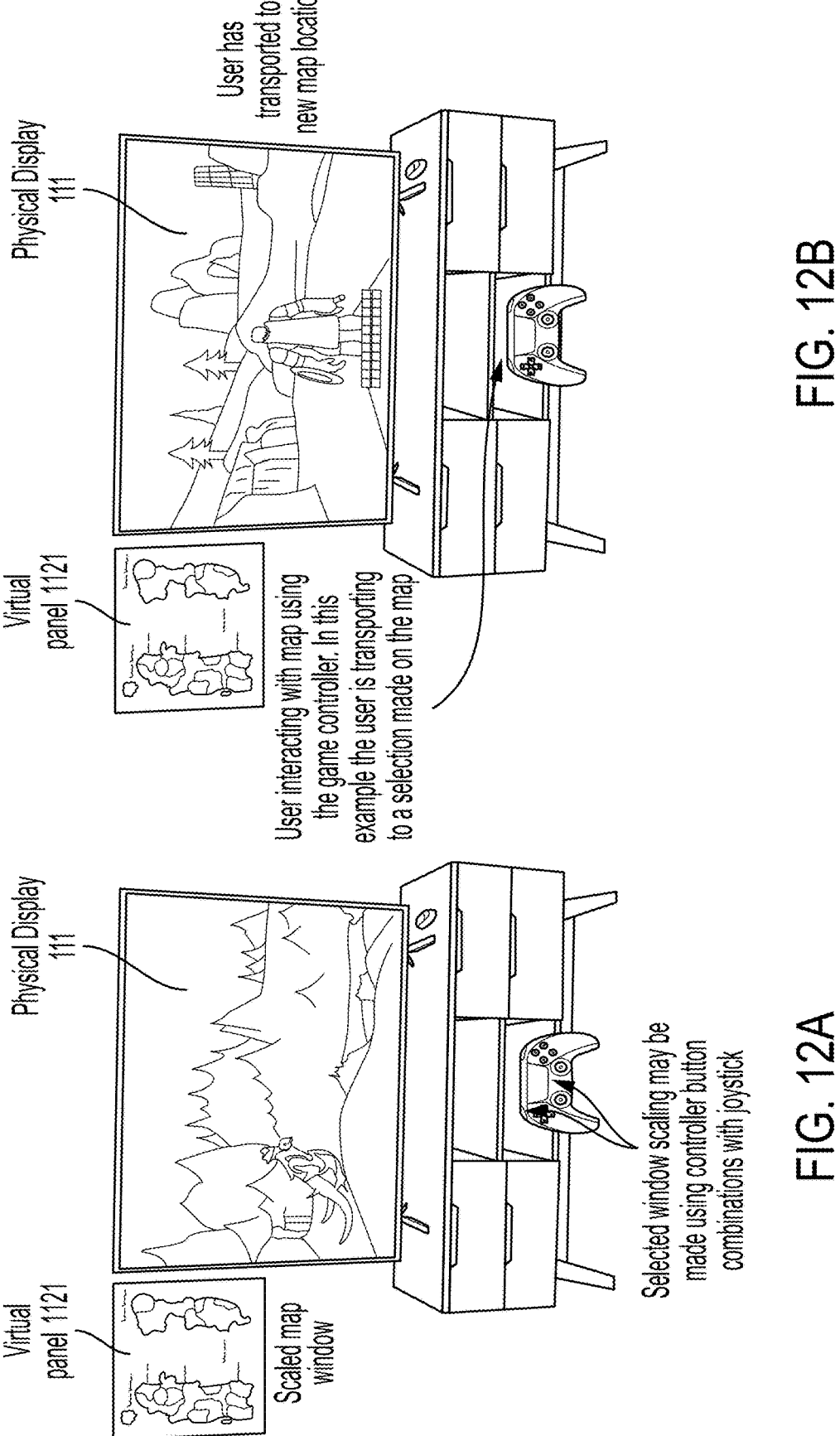

FIGS. 11A and 11B illustrate, respectively the panel 1121 in the process of being dragged off and finally as an independent virtual display 1121. Other user commands or inputs for launching a virtual display may include right clicking on an application and selecting "Open in XR" as a menu choice, keyboard key combinations, voice commands, or the like. In addition, based on a setting selected by the user, or based on the system learning user preferences over time, an application might always open in XR each time the application is opened or upon the device being restarted/rebooted. FIG. 12A illustrates that a map window showing an aspect of the game application may be created based on the game application to augment the game experience and then may be rendered as virtual display content. FIG. 12B illustrates that the map window provided as a virtual display 1121 may be scaled as needed.

The position of physical displays may be determined according to where the user initially positions the physical display 111, as shown in FIGS. 13A-B. A position of an extended virtual display relative to a primary physical display 111 may be manually set. In an embodiment, virtual displays may be positioned and automatically repositioned. For example, FIGS. 13A and 13 B show the setting of the position of extended physical display 2 in relation to primary physical display 1.

Figure 14:
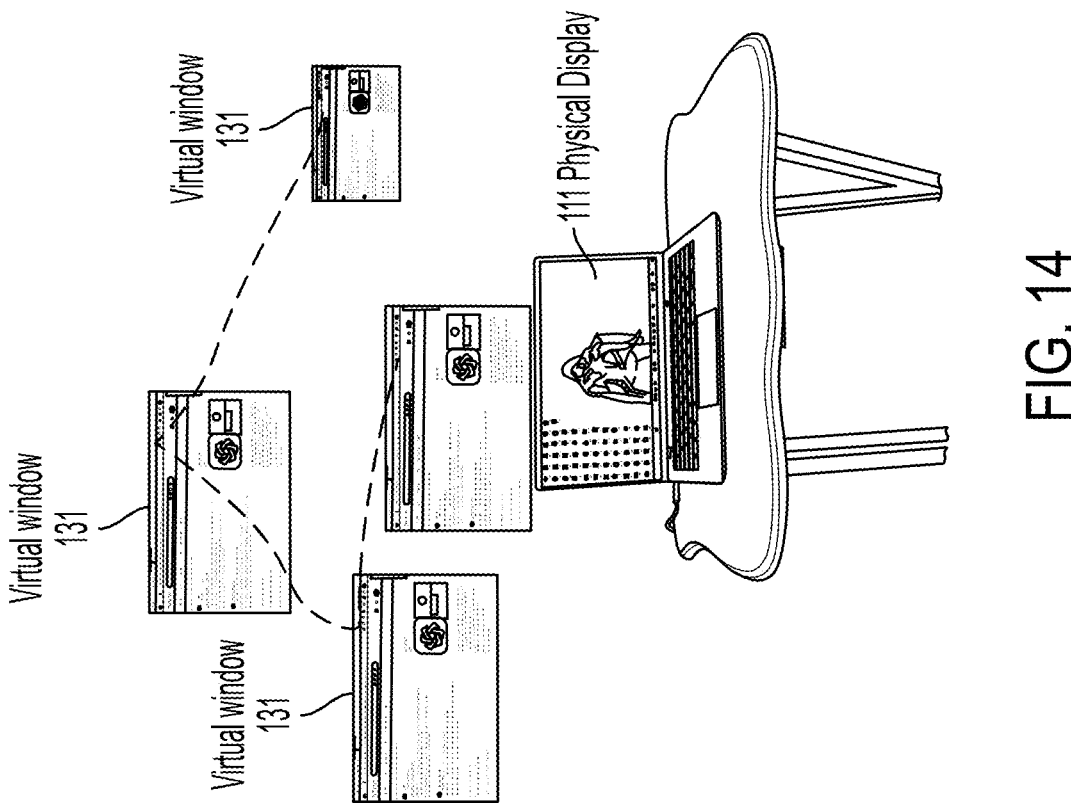
FIG. 14 illustrates an example of a coordinate system calculation for positioning the virtual application window in relation to the physical space, according to an aspect of the disclosure.

FIG. 14 is an example of a coordinate system calculation for setting a relationship for the spatial coordinates in a 3D spatial mapping space. This may be used for positioning virtual window 131 in relation to physical space or to an object therein. A perspective transform may be performed to account for the offset differences based on the relative distance at each position of the virtual window 131 to the physical space. The perspective transform may be locked allowing the user to select just the edges of an application window to drag the virtual window 131 to a desired position. When the physical device is moved, the spatial coordinates of the virtual application windows 131 may remain unchanged. In an embodiment, a position of a virtual window in a physical space may be stored for future use. For example, when the physical device returns to a physical space, the virtual window for the relevant application may open automatically at the same position in the physical space, or in the same relation/orientation/spacing with respect to the physical device 101. Similarly, an application may launch so that its output is displayed in a virtual window at the same location as in a previous use of the application.

Figure 15:
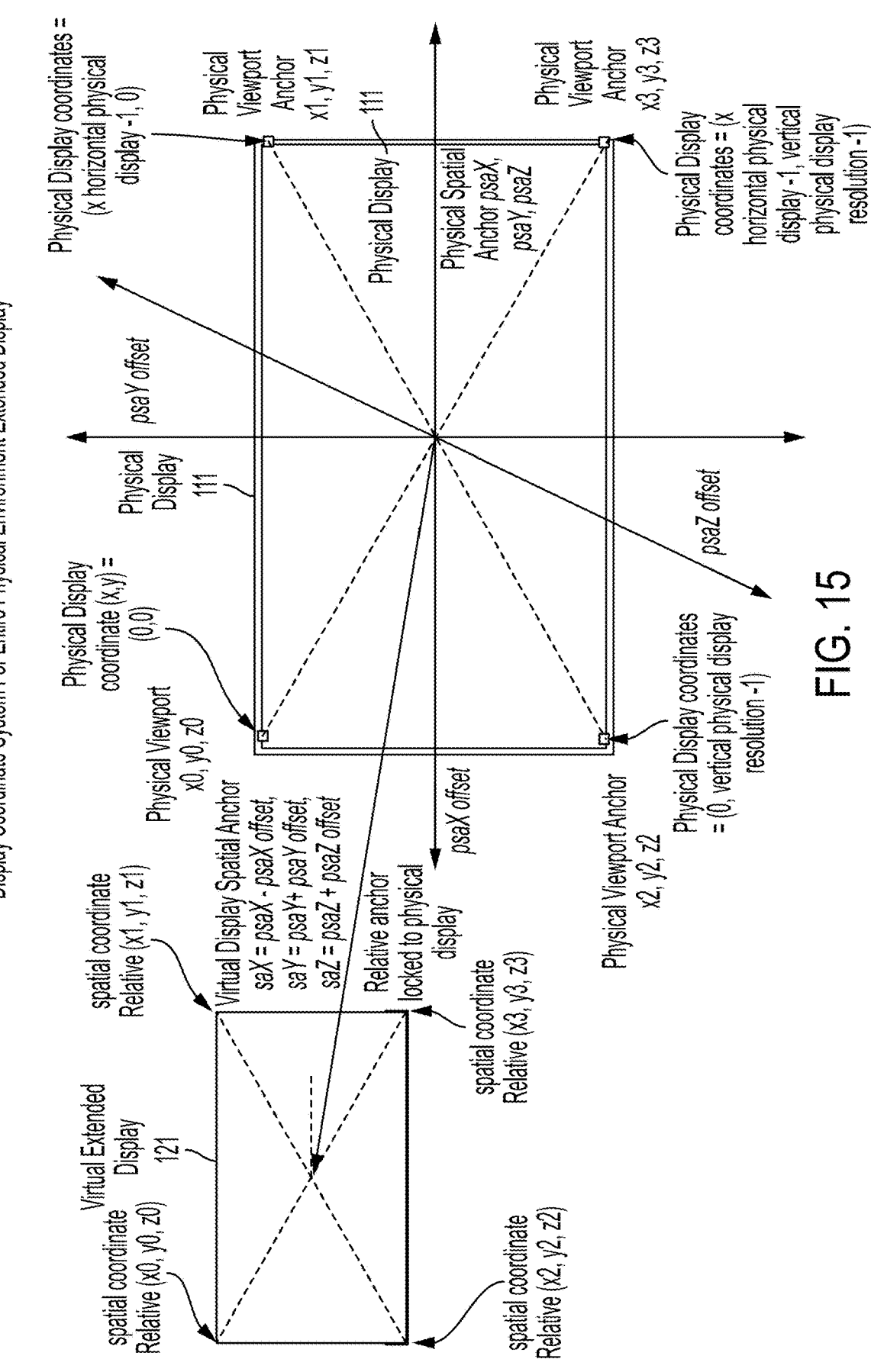
FIG. 15 illustrates an example of anchoring a virtual display in the physical space, according to an aspect of the disclosure.

FIG. 15 shows an example of a coordinate system calculation for the relationship for the spatial coordinates of the physical display 111 to the spatial coordinate system defining positions of the virtual display 121. Spatial anchors of the virtual display 111 may be associated with anchors of the physical display 111 as illustrated in FIG. 15. If the physical display 111 is moved to another location, or otherwise repositioned, for example, a viewing angle of the physical display 111 is adjusted, the virtual display 121 is also moved so as to be rendered in the XR HMD in the physical space to maintain the previous viewing relationship. A perspective transform may be performed to account for the offset differences based on the relative distance to the physical display 111.

Figure 16:
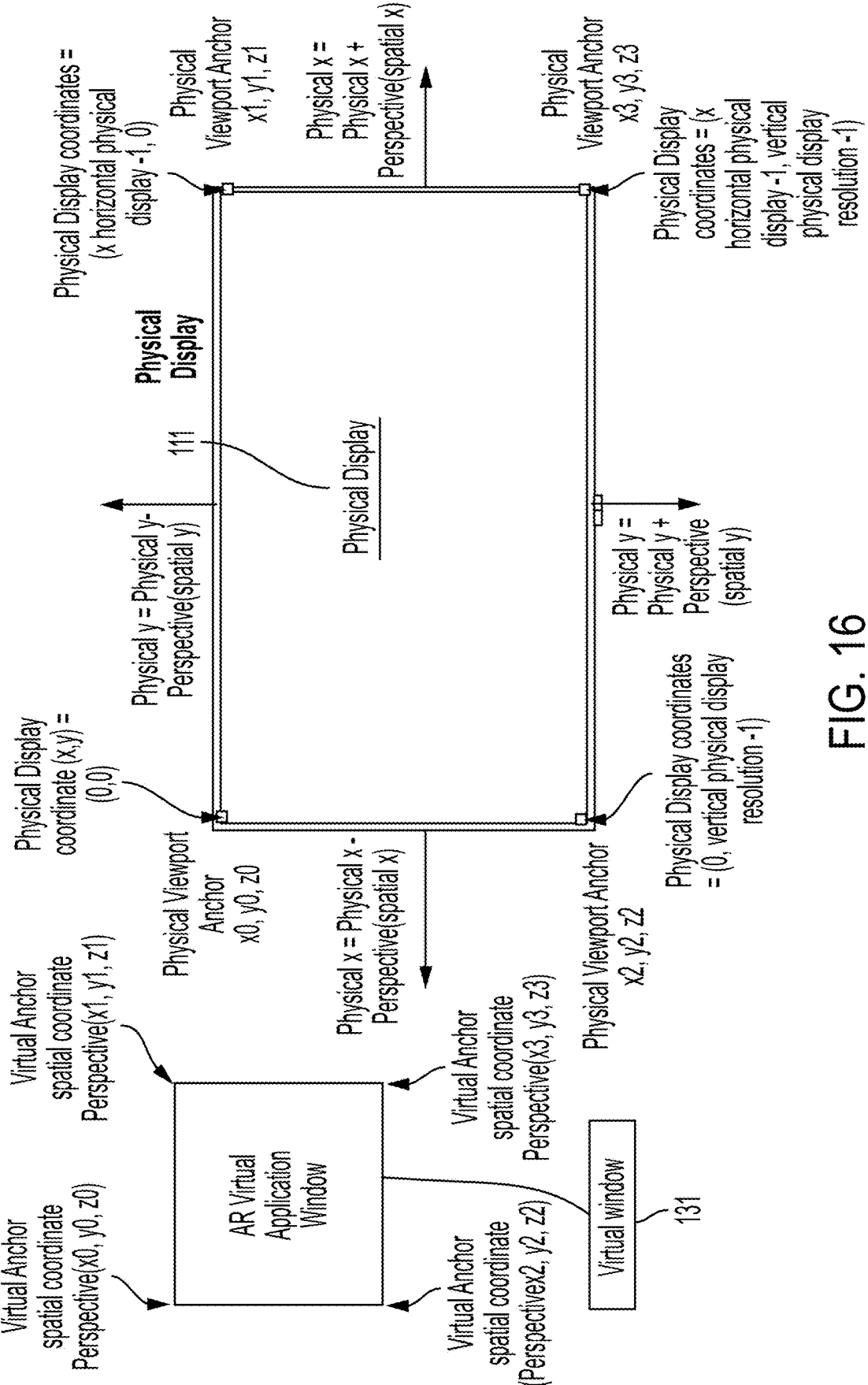
FIG. 16 illustrates an example of a relationship in the positions of the virtual window to the physical space, according to an aspect of the disclosure.

FIG. 16 shows a relationship in the positions of the virtual application window 121 to the physical display 111. The perspective transform may be locked allowing the user to select just the edges of an application window to position the tilt or viewing angle of a virtual application window 121, and thus limiting the number of spatial coordinates to where an edge may be moved.

Figure 17:
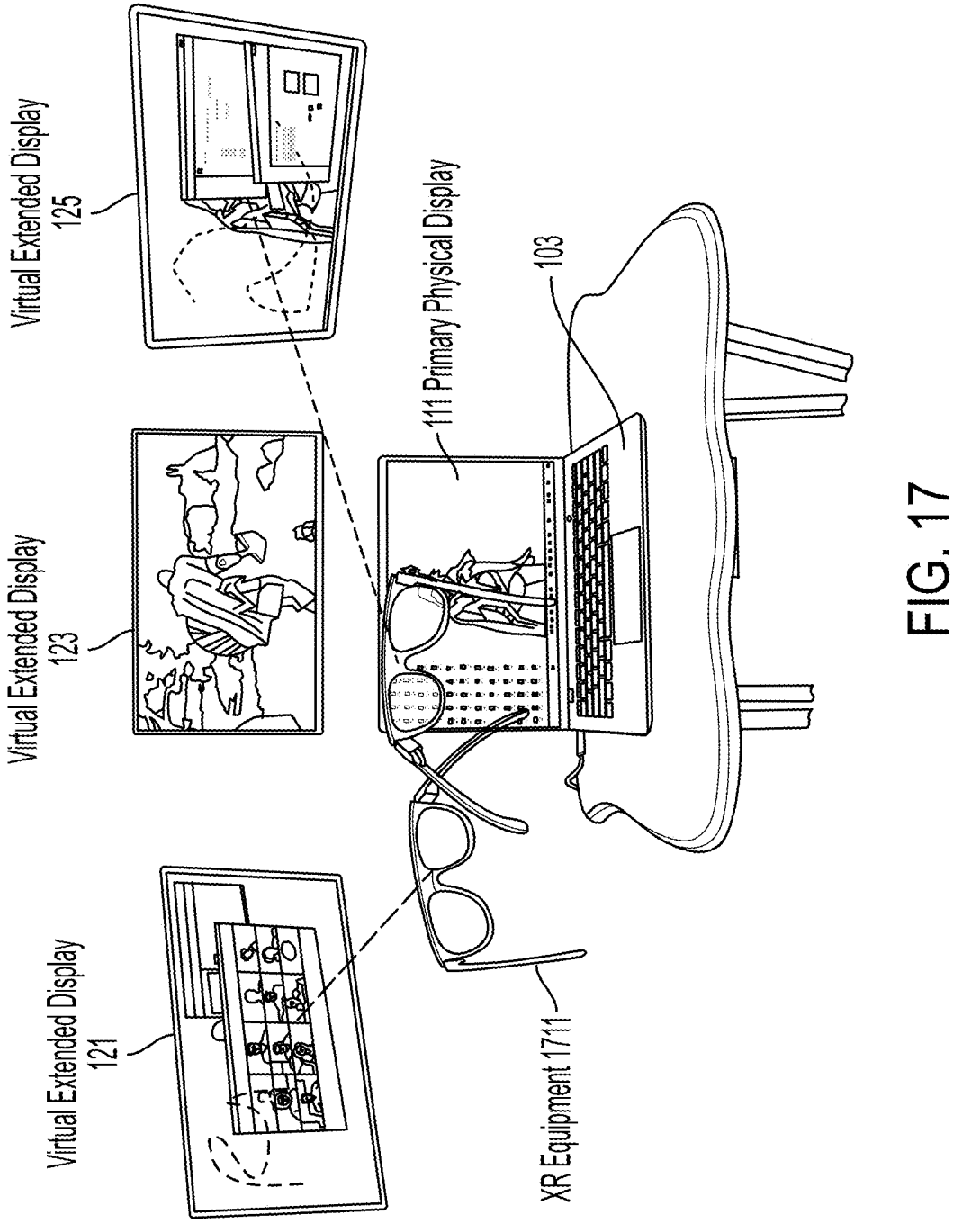
FIG. 17 illustrates gaze tracking using the XR HMD to determine an active display, according to an aspect of the disclosure.

In an embodiment, a virtual display 121, 123, 125 or a physical display 111 may have focus depending on the gaze of the user using the XR HMD. The physical controller 103 controls the application(s) associated with the display of focus. As shown in FIG. 17, at time T1, a user gaze is detected by VR HMD glasses 1711 oriented toward virtual display 121. Inputs to physical controller 103 are thus applied to the application associated with virtual display 121. The system may limit cursor movement, as driven by mouse, trackpad or joystick signals, in the GUI of virtual display 121. In an embodiment, moving the cursor to a different display may be done in response to a mouse/trackpad/joystick signal in combination with another key signal, for example, a tab key, windows key or CTRL key signal. At time T2, a user gaze is detected by XR HMD glasses 1711 oriented toward virtual display 125, and thus virtual display 125 is set as the display of focus. The most recent cursor position of virtual display 125 may be recalled and resumed on the virtual display 125 at this time. Inputs to physical controller 103 are thus applied to the application associated with virtual display 125.

In an embodiment, if two or more XR equipment, such as two HMDs, are simultaneously detected to be on in the vicinity of the system, the direction of user gaze may be determined separately for each HMD. In this way, one HMD may be paired with a first physical display, virtual display or virtual window, while a second HMD may be simultaneously paired with a second physical display, virtual display or virtual window. The first display at which a first user's gaze is detected would be active and user input entered on a first physical controller would be processed accordingly with output rendered on the paired physical display, virtual display or virtual window. A second physical display, virtual display or virtual window at which the second user's gaze is detected may also be active and user input entered on a second physical controller, would be processed. The second display would be rendered accordingly.

Figure 18:
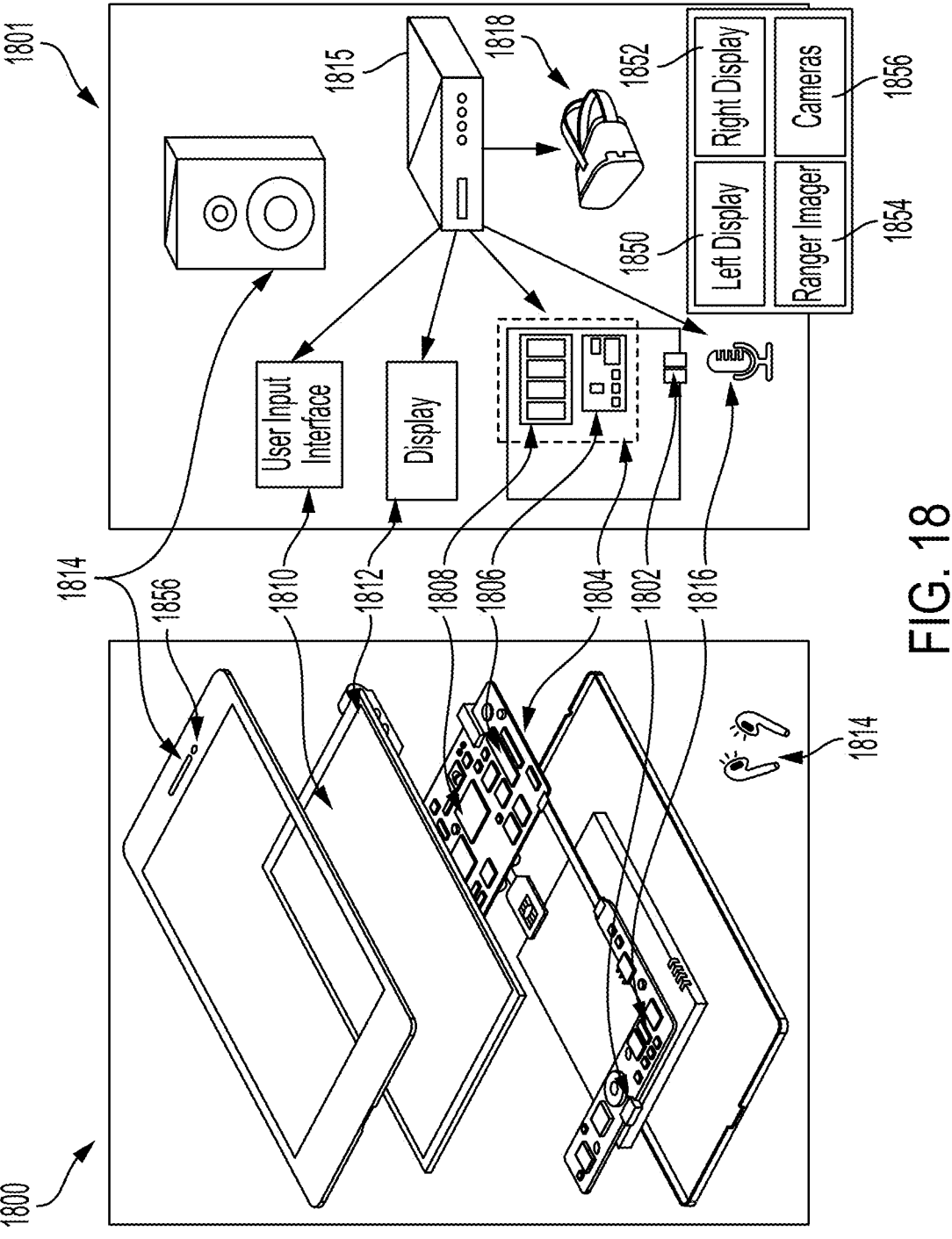
FIG. 18 illustrates a computer system for implement methods described herein, according to an aspect of the disclosure.

FIG. 18 illustrates an example of an implementation of the physical device 101, including some components thereof, a physical display 111 and the XR HMD 411. A circuit board may include control circuitry 1804, processing circuitry 1806, and storage 1808 (e.g., RAM, ROM, hard disk, removable disk, etc.). In some embodiments, the circuit board may include an input/output path for communicating with the HMD 1818 of the XR HMD 411 and/or with XR HMD controller 1921 as a remote device. Each device

1800/1801 may receive content and data via input/output (I/O) path 1802 that may comprise I/O circuitry (e.g., network card, or wireless transceiver). I/O path 1802 may communicate over a local area network (LAN) or wide area network (WAN), for example, via Wi-Fi, Bluetooth, cellular or other wireless or wired connection, may receive audio input via microphones 1816 and provide audio via speakers 1814 and video via display 1812.

Control circuitry 1804 may comprise processing circuitry 1806 and storage 1808 and may comprise I/O circuitry. Control circuitry 1804 may be used to send and receive commands, requests, and other suitable data using I/O path, which may comprise I/O circuitry, and for transmitting displays to be provided by the HMD of the XR HMD controller 411. I/O path may connect control circuitry 1804 (and specifically processing circuitry) to one or more communications paths (described below). I/O functions may be provided by one or more of these communications paths, but are sometimes shown as a single path to avoid overcomplicating the drawing.

Control circuitry 1804 may be based on any suitable control circuitry such as processing circuitry 1806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 1804 executes instructions for various applications, including the XR application, stored in memory (e.g., storage 1822). Specifically, control circuitry 1804 may be instructed by the XR application to perform the functions discussed above and below. In some implementations, processing or actions performed by control circuitry may be based on instructions received from the XR application.

In client/server-based embodiments, control circuitry 1804 may include communications circuitry suitable for communicating with other networks. The XR application may be implemented as software or as a set of executable instructions. The instructions for performing any of the embodiments discussed herein may be encoded on non-transitory computer-readable media (e.g., a hard drive, random-access memory on a DRAM integrated circuit, read-only memory etc.). For example, the instructions may be stored in storage 1808, and executed by control circuitry 1804 of a device 1800.

In some embodiments, the XR HMD controller 1921 may be a client residing on device 1808 (e.g., device 1800), and a server application resides on the physical device. Control circuitry 1804 may include communications circuitry suitable for communicating with a server, XR equipment controller 1921 and devices, a table or database server, or other networks or servers. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 1808 that is part of control circuitry 1804. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 1822 may be used to store various types of content described herein. Nonvolatile memory may also be used (e.g., to launch a boot-up routine and other instructions).

Control circuitry 1804 may include video generating circuitry and tuning circuitry. Control circuitry 1804 may also include scaler circuitry for upconverting and down converting content into the preferred output format of equipment 1800. Control circuitry 1804 may also include digital-to-analog converter circuitry and analog-to-digital converter circuitry for converting between digital and analog signals. In some embodiments all elements of system 1800 may be inside housing of the XR display device 1818. In some embodiments, XR HMD display device 1818 comprises a camera 1856 (or a camera array or LiDAR-Light Detection and Ranging). Video cameras may be integrated with the equipment or externally connected. One or more of cameras may be a digital camera comprising a charge-coupled device (CCD) and/or a complementary metal-oxide semiconductor (CMOS) image sensor. In some embodiments, one or more of cameras 1856 may be dirtied at outside physical environment (e.g., two cameras may be pointed out to capture to parallax views of the physical environment). In some embodiments, XR HMD 411 may comprise one or more biometric sensor or sensors to measure eye rotation (e.g., electrodes to measure eye muscle contractions) and head movement. HMD 1818 may also comprise range image 1854 (e.g., LASER or LIDAR) for computing distance of devices by bouncing the light of the objects and measuring delay in return (e.g., using cameras 1856). In some embodiments, HMD 1818 comprises left display 1850, right display 1850 (or both) for generating VST images.

The XR HMD controller 1921 may be implemented using any suitable architecture. For example, it may be a stand-alone application wholly-implemented on each one of user equipment device 1800 and user equipment device 1801. In such an approach, instructions of the application may be stored locally (e.g., in storage 1808), and data for use by the application is downloaded on a periodic basis (e.g., from the edge service network, from an out-of-band feed, from an Internet resource, or using another suitable approach). Control circuitry 1804 may retrieve instructions of the application from storage 1808 and process the instructions to provide XR generation functionality and perform any of the actions discussed herein. Based on the processed instructions, control circuitry 1804 may determine what action to perform when input is received from user input interface 1810. For example, head movement or movement of a hand or handheld device via user input interface 1810. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the XR application may be downloaded and interpreted or otherwise run by an interpreter or virtual machine (run by control circuitry 1804). In some embodiments, the XR application may be encoded in the ETV Binary Interchange Format (EBIF), received by control circuitry 1804 as part of a suitable feed, and interpreted by a user agent running on control circuitry 1804. For example, the XR application may be an EBIF application. In some embodiments, the XR application may be defined by a series of JAVA-based files that are received and run by a local virtual machine or other suitable middleware executed by control circuitry 1804. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 602-11x, etc.), or other short-range communication via wired or wireless paths. The user equipment devices may also communicate with each other directly through an indirect path via communication network.

Although communications paths are not always drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network.

Figure 19A:
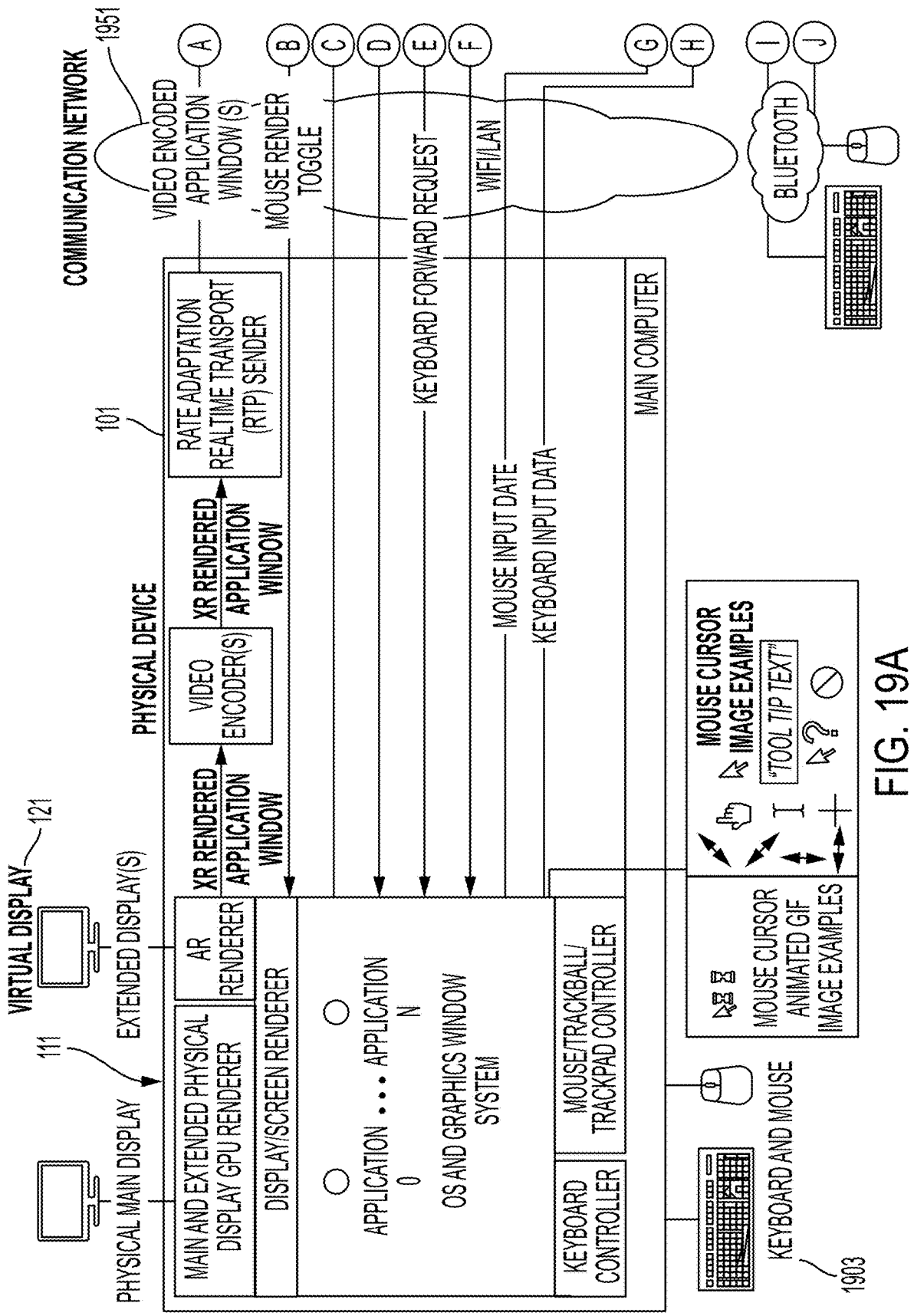
FIGS. 19A-21B illustrate components of a system according to an aspect of the disclosure, including the physical controller and physical display of the physical device, the XR HMD, and the XR HMD controller interfacing via a data network with the physical device.
Figure 19B:
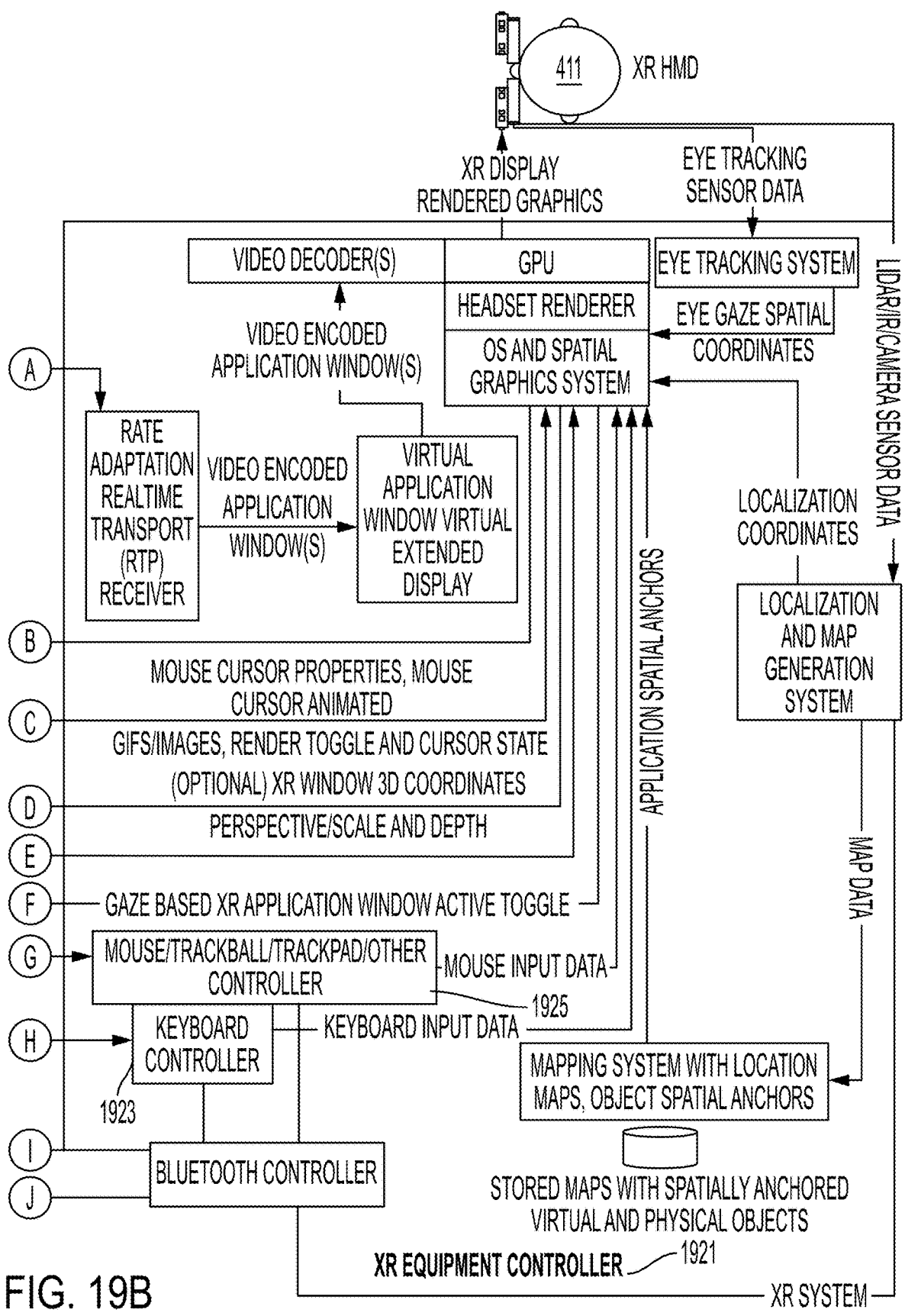

FIGS. 19A-19B show an example of a system architecture for enabling cursor movement and rendering, interaction of the physical device 101 with keyboard and mouse 1903, physical display 111, virtual display 121, XR HMD 411, and XR HMD controller 1921. As discussed, eye gaze detection may be used for automatically making active an application and/or display as the application and/or display of focus. The cursor may also be moved into the window thus made active. Cursor, mouse/trackpad/joystick position data and keyboard data may be transmitted via communication network 1951 from the OS and graphics handler of the physical device 101 to keyboard controller 1923 and the cursor controller 1925 of the XR HMD controller 1921. Communication network 1951 may be, for example, a local area network facilitated by a wireless router or may be the internet. This may facilitate seamless transition of work between the XR HMD 411/XR HMD controller 1921 and the physical controller 103.

An interface between the OS and graphics windowing system of the physical device 101 to the OS and spatial graphics system of the XR HMD controller 1921 may allow transmission of the mouse cursor properties, cursor images and animated GIFs and cursor state to the XR HMD 411 for rendering the mouse cursor when the cursor should be rendered on virtual display 121 along with the cursor image to render based on the cursor state. In an embodiment, the cursor may also be rendered in space between displays to inform via the XR HMD 411 displays of cursor positioning from one display to another.

The cursor and the virtual displays 121, 123, 125 may be rendered by the XR HMD 411 when the cursor is on a virtual display 121, 123, 125 and/or when the cursor is outside of the graphical user interface of the physical display 111 and outside coordinates of a virtually rendered display 121, 123, 125. XR HMD controller 1921 may notify physical device 101 which virtual display 121, 123, 125 or physical display 111, and/or which application window of the active display has focus/active. An interface between the XR HMD controller 1921 and the spatial and graphics system of the physical device 101 may communicate the 3D coordinates of the virtual display 121, 123, 125 so that the physical device 111 may scale and adjust pixel values and cursor position for the virtual displays 121, 123, 125. The application windows rendered graphics may be encoded and sent to the display of the XR HMD 411 for rendering. A cursor theme may be selected so that the virtual space cursor theme matches the cursor displayed by the physical display 111, as illustrated in cursor selection box 1961. In a further embodiment, the cursor displayed in virtual space between virtual windows may appear different from the cursor shown by physical display 111 and by virtual windows to highlight the fact that the cursor is in virtual space. This may aid the user in following the movement of the cursor between displays and may also convey to the user that normal user input operations are paused while the cursor is shown in between displays or between virtual windows. For example, the cursor may be displayed more prominently or may have a more prominent or larger appearance while between displays or virtual windows to make it more readily visible among other physical objects in the physical space.

There may be an interface for sending the mouse and keyboard data from the OS and Graphics on the physical device 101 to the Keyboard Controller and the Mouse/Trackball/other controller in the XR HMD 411. This allows the mouse and keyboard to work on both the physical device and the virtual displays or windows. An interface between the physical device's OS and Graphics Windowing System and the XR HMD's OS and Spatial Graphics System may enable transmission of mouse cursor properties, cursor images and animated GIFs and cursor state to the XR HMD 411 for rendering the mouse cursor when the cursor should be rendered in the physical space along with the proper cursor image to render, based on the cursor state. A render mouse toggle interface between the OD Graphics Window System and the OD and Spatial Graphics System may enable toggling between rendering the cursor on the physical device 101 or the XR HMD. The cursor rendering may be rendered by the XR headset when the cursor is in the physical space outside of the spatial coordinates of a physical display or a virtually rendered application window. In addition, an interface between the OD Graphics Window System on the computer and the OS and Spatial Graphics System may request keyboard input data, depending on where the mouse cursor position is. A gaze-based AR Application Window Active Toggle from the XR HMD's OS and Spatial Graphics System to the computer's OS and Graphics Windows System so the XR headset can inform the physical device 101 as to which application window has focus/is active regardless of whether the application is rendered in a physical display or in an XR virtual remote rendered application window. An interface between the XR HMD's OS and Spatial Graphics System and the computer's PS and Graphics Window System may be present for the AR window 3D coordinates with perspective and scale to allow the physical device 101 to adjust cursor pixel values if needed for precision in a virtual window. For display, the application window rendered graphics may be encoded and sent to the XR HMD display for rendering in a spatially anchored virtual window.

Figure 20A:
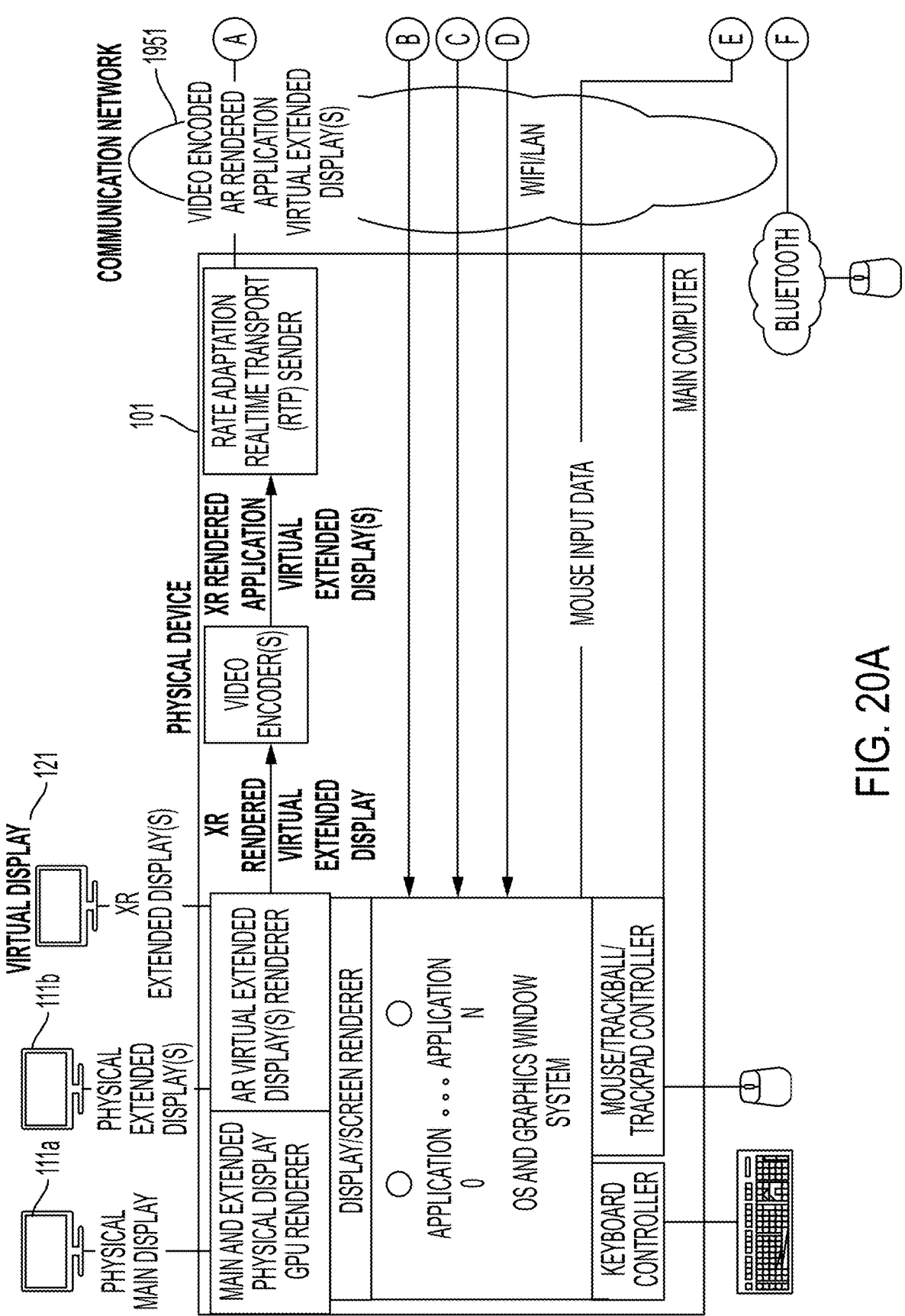
Figure 20B:
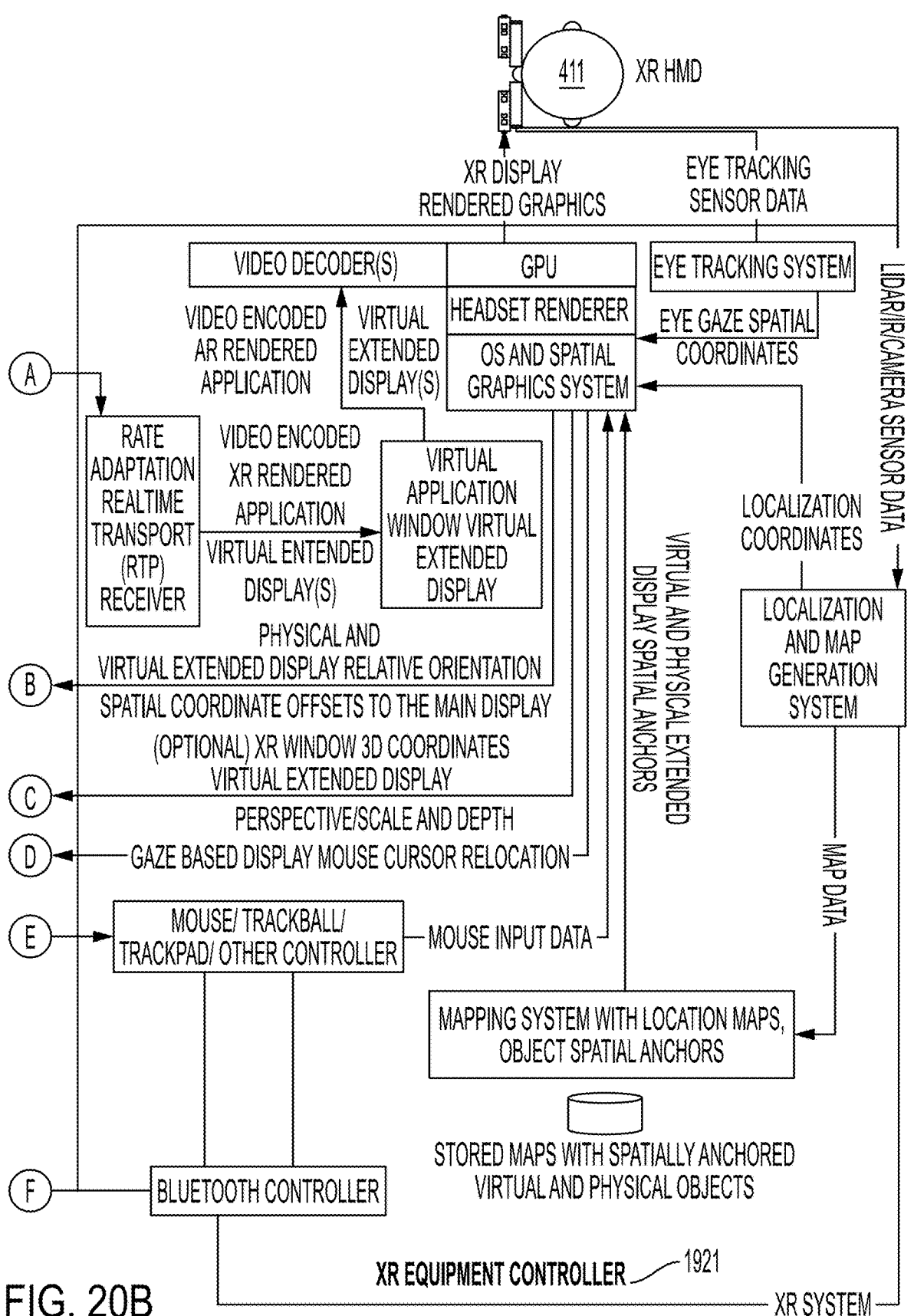

FIGS. 20A-20B show an example of a system architecture with a primary physical display 111a and an extended physical display 111b. An interface between the OS and spatial graphics system of the XR HMD controller 1921 and OS and graphics window system of the physical device 101 facilitates transmission of relative orientation of spatial coordinate offsets.

Figure 21A:
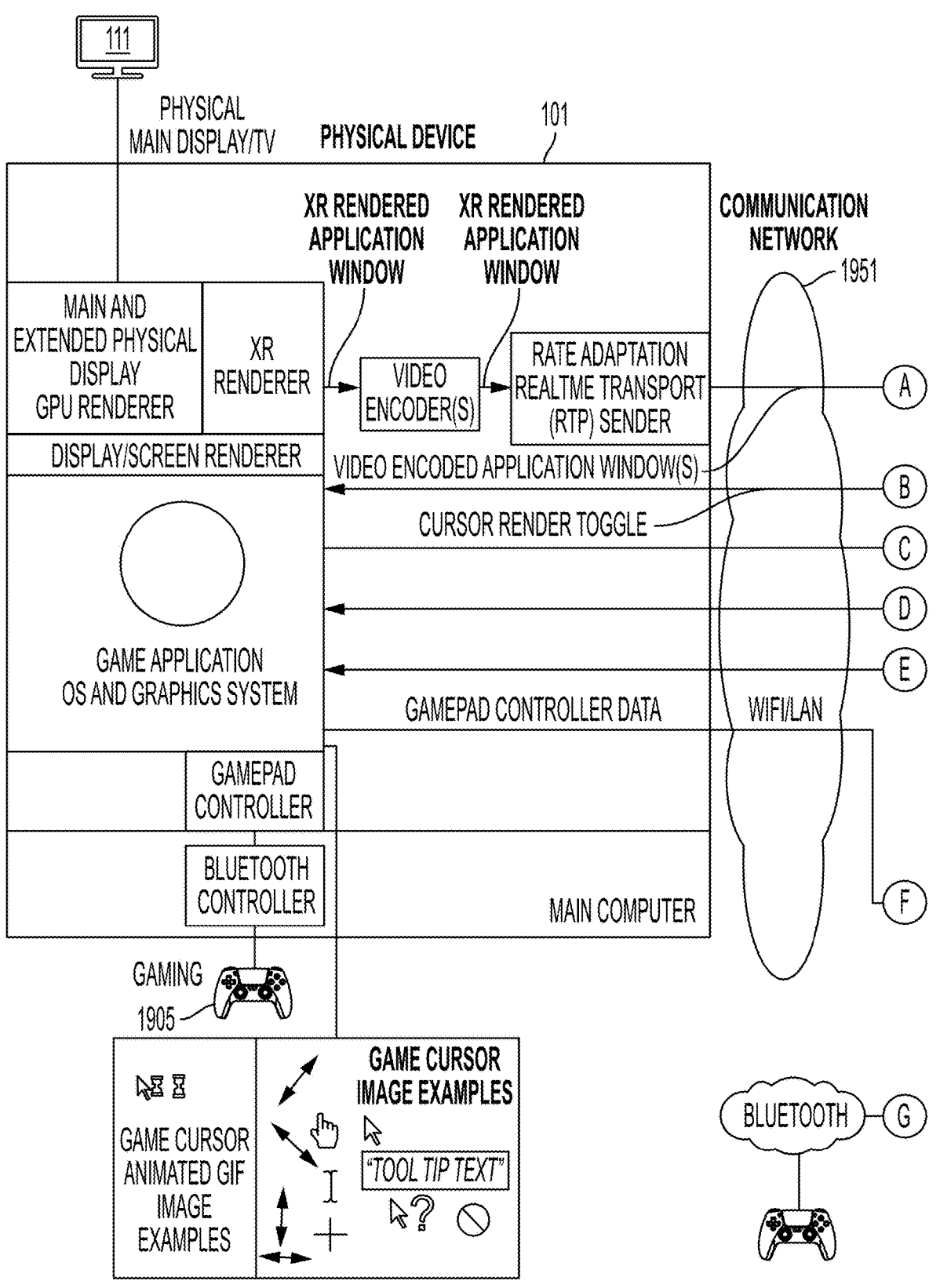
Figure 21B:
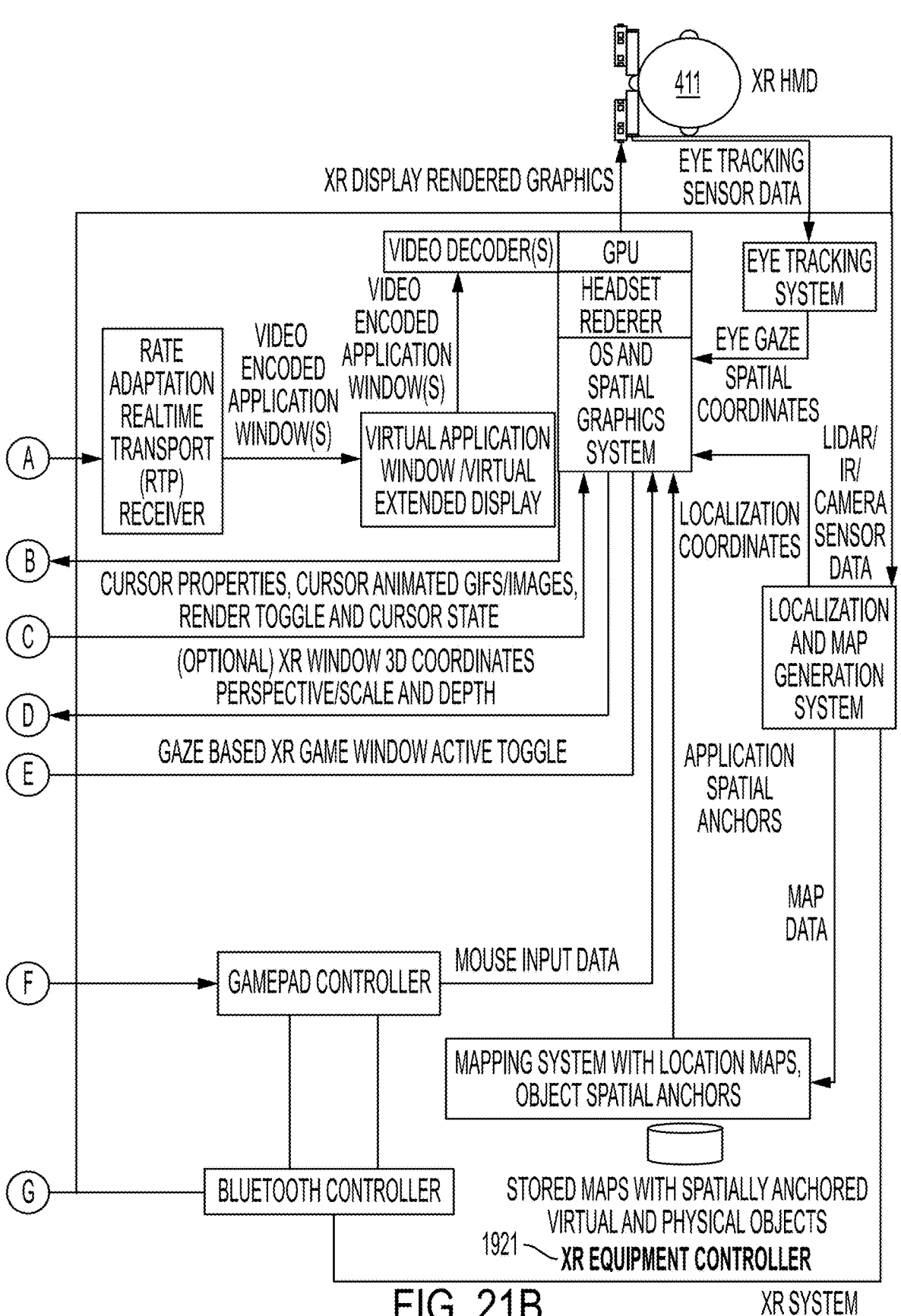

FIGS. 21A-21B show an example of a system architecture with a gaming controller 1905 connected to the console integrated with or connected to the physical device 101 via a wired or wireless connection. User inputs received by physical device 101 may be used to control the game application or to relocate a game window, and corresponding instructions or notifications may be transmitted via the communication network to 1951 to XR HMD controller 1921 for controlling rendering by the XR HMD 1921, as described herein.

Figure 22:
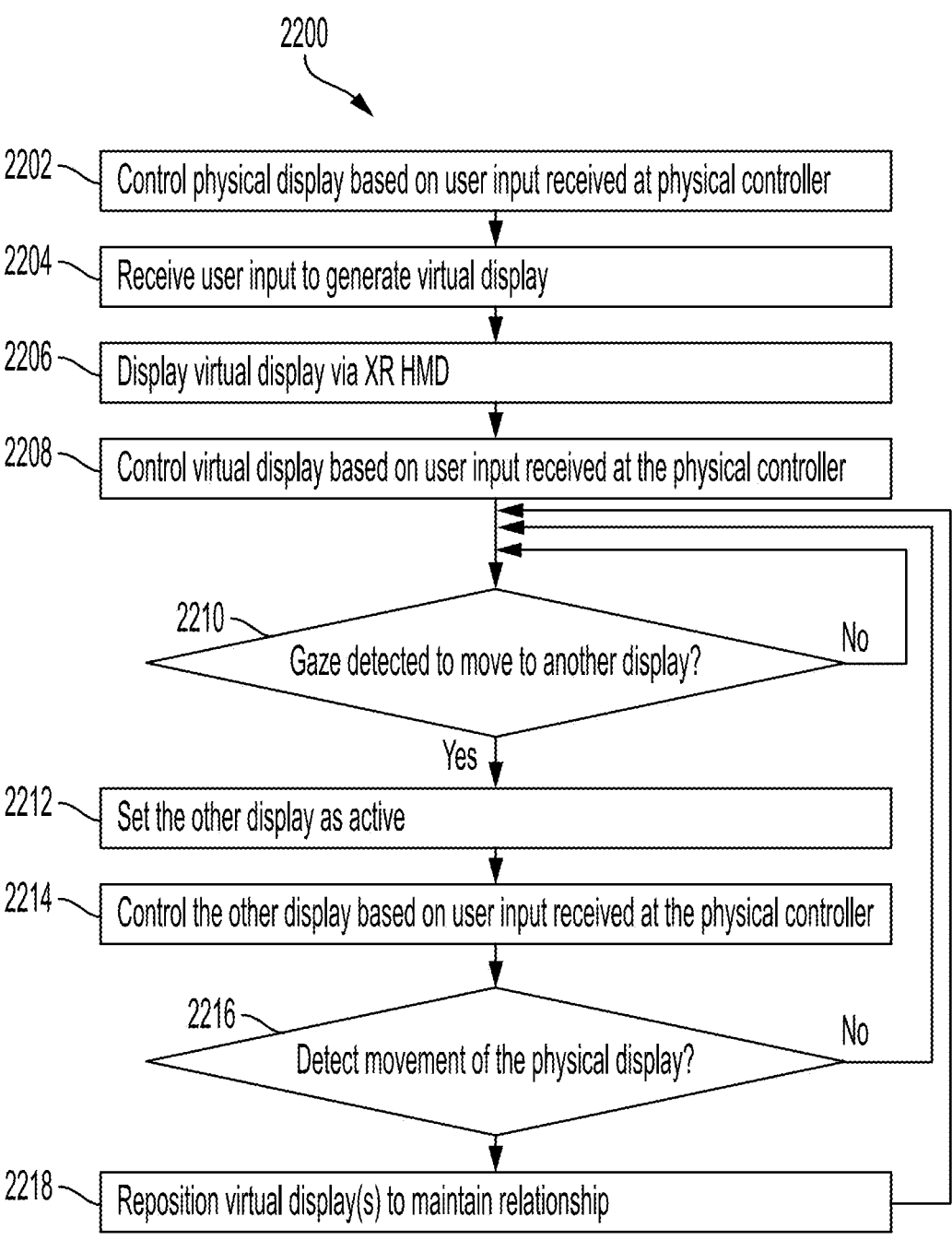
FIG. 22 illustrates a process for generation of a virtual display and controlling it and the physical display from the physical controller, according to an aspect of the disclosure.

FIG. 22 is a flowchart that illustrates a process according to an aspect of the disclosure. The method 2200 may be implemented, in whole or in part, by the system 1801 shown in FIG. 18. One or more actions of the method 2200 may be incorporated into or combined with one or more actions of any other process or embodiments described herein. The method 2200, or portions thereof, may be saved to a memory or storage (e.g., of the systems shown in FIG. 18) or locally as one or more instructions or routines, which may be executed by any suitable device or system having access to the memory or storage to implement the method 2200.

As shown in FIG. 22, at 2202, the physical display 111 is controlled based on user input that is received via the physical controller 103. The physical display may be providing the output of one or more applications running on a physical device 101 associated with the physical controller 103.

At 2204, a user input for generating a virtual window 131 is received. For example, as shown in FIG. 8, the user may drag a window, other panel or element of a graphical user interface off the physical display 111. More than one such virtual window may be created in a similar manner. In an embodiment, the virtual window 131 is positioned in space in accordance with the movement of the cursor, and thus the virtual window 123 may be positioned as directed by the cursor. According to a further embodiment, the virtual window 131 is automatically positioned at a pre-specified space so that it is positioned along an arc centered on the physical display 111.

As illustrated in FIG. 1, virtual displays 121, 123, 125 may be positioned along an arc centered on the physical display 111. Further, virtual displays 121, 123 and 125 may appear to be slightly tilted with respect to a vertical plane so as to be more easily visible to a user behind the physical display 111. Similarly, virtual displays 121, 123 and 125 may be automatically set to a specified size and at a specified distance from the XR HMD 411.

The physical device 101 may transmit coordinates for the virtual display 121 and data for displaying the virtual display 121 to XR HMD controller 1921 for generating the virtual display 121 at the XR HMD 411. For example, the physical device 101 may transmit the output of an application running on the physical device 101 to the XR HMD controller 1921. Accordingly, a virtual display 121 is displayed at 2206.

At 2208, the virtual display 121 thus created is controlled via user input received at the physical controller 103. The application may continue to run on the physical device 101 but the output thereof may be transmitted to the XR HMD controller 1921.

At 2210, head movement and/or eye movement of the user wearing the XR HMD 411 may be detected. In this way, the gaze of the user may be determined to have switched to another display, for example, to another virtual display 123, 125 or to the physical display 111. For example, XR HMD 411 may include one or more cameras for determining head and/or eye movement of the wearer of an HMD.

At 2212, the display to which the gaze is determined to be directed may be set as the display of focus, the active display. User input received is then directed to this display. The newly active display may be made larger, may be moved to a central location, or may be highlighted in other ways, for example, using colors around the borders of the display or around the borders of the application active on the display. A cursor position most recently used on the this display may be reactivated at that previous position. At this time, the cursor may be made more bold or otherwise highlighted. In an embodiment, cursor movement off of the graphical user interface area of the active display is prevented. In this way, the user may be aided in focusing on the display that is active without losing the cursor.

In an embodiment, a finer grain gaze detection may be provided, so that the system may determine to which window or graphical user element displayed on the relevant display the user's gaze is directed. The application associated with that window or graphical user element may be set as active to which user input received will be directed. It will be understood that other methods for selecting the active display and/or the active application may be provided instead of, or in addition to, a gaze detection method. For example, the user may direct the cursor 113 to designate the active display and/or the active application. In addition, or instead, the user may use hand gestures detected by the camera or cameras of the XR HMD 411.

At 2214, further user input received at the physical controller 103 is applied to the application displayed on the newly selected display. As further user inputs are received for the relevant application, the output of that application is transmitted to XR HMD controller 1921 and rendered on the XR HMD 411. In an embodiment, the user may interact with the application using hand gestures or other extended reality/augment reality/virtual reality methods. In addition, the user may dictate or otherwise provide input via XR HMD 411. This input may be transmitted by XR HMD controller 1921 to the physical device 101 and applied as needed to the application running on the physical device 101.

It is determined at 2216 whether the physical display 111 has been moved. For example, the physical display 111 may be detected to be rotated, perhaps in response to a user shift in sitting posture, or the physical display 111 may be moved to a different desk or room entirely.

If movement is detected, then at 2218 the virtual displays 121, 123, 125 may be moved to maintain the positional relationship with the physical display 111. In this way, the constellation of the physical display(s) and virtual displays 121, 123, 125 is moved to maintain the same positional relationship with the physical display 111. Such movement of the physical display 111 may be determined using cameras of the XR HMD 411 or by other means. In an embodiment, one or more virtual displays 121, 123, 125 may be moved off the common virtual display arc or vertical plane so that it is not moved in response to the movement of the physical display 111. For example, it may be desirable to retain a virtual display at a particular location in a room regardless of the movement of the physical device 101.

Figure 23A:
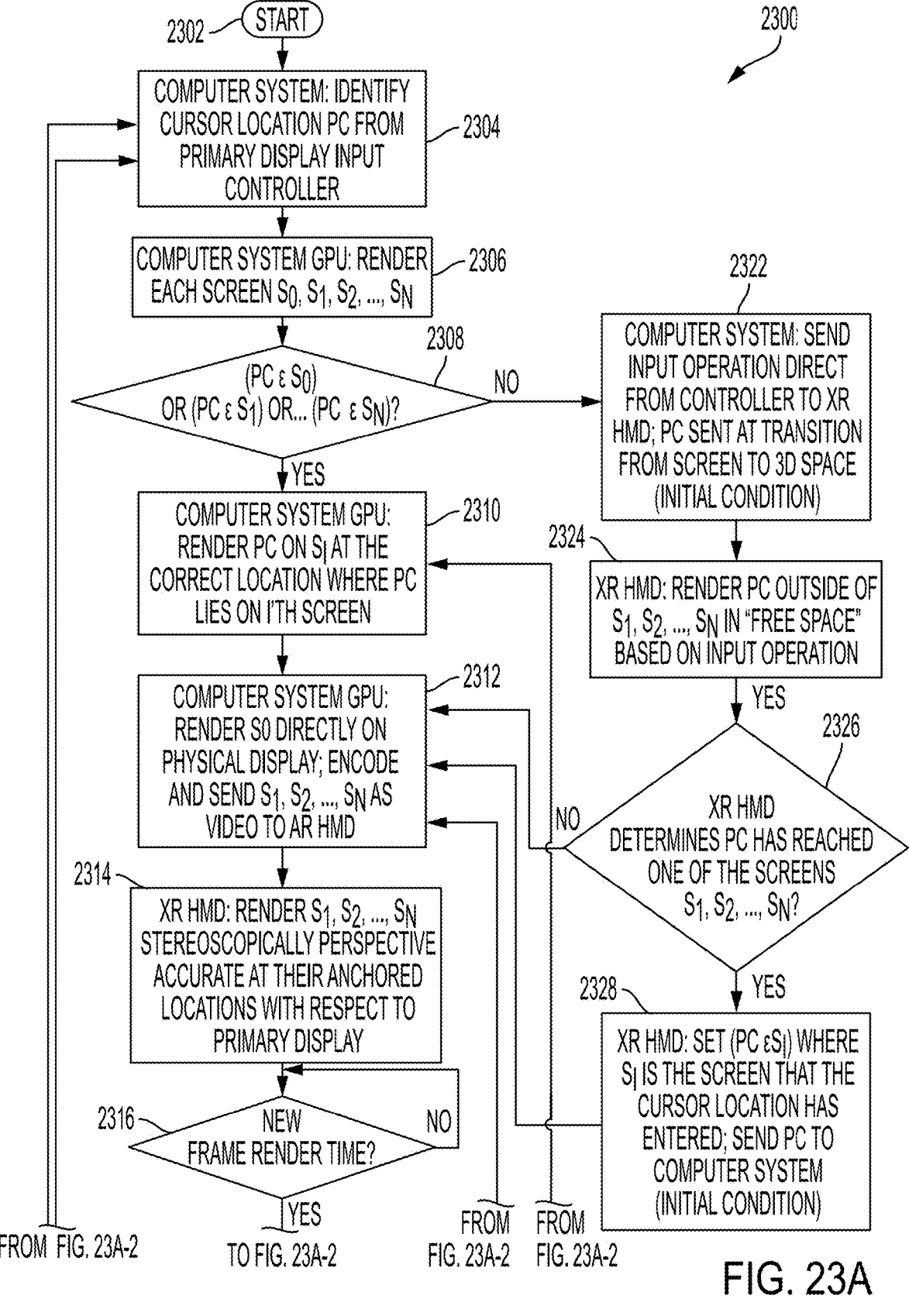
FIGS. 23A-23C illustrate a process for cursor tracking, according to an aspect of the disclosure.
Figure 23B:
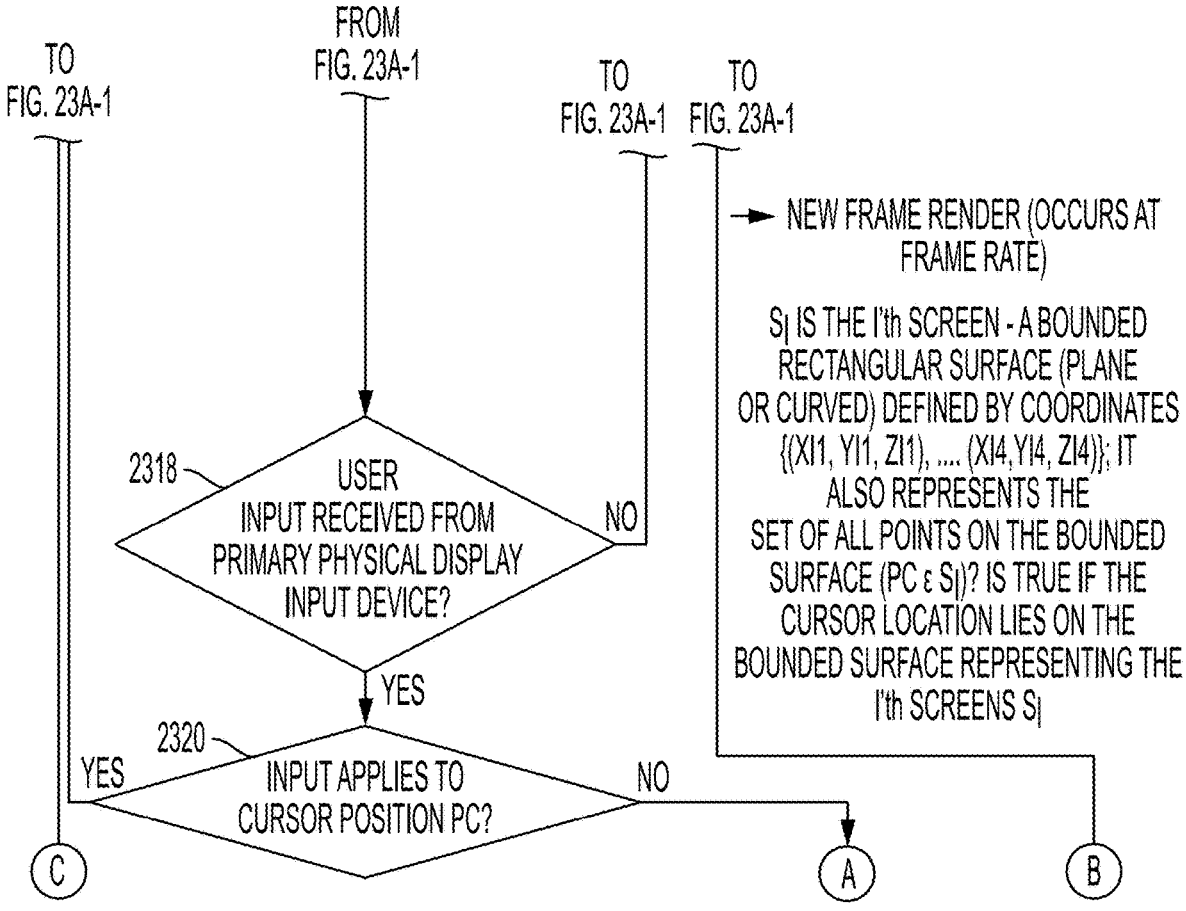
Figure 23C:
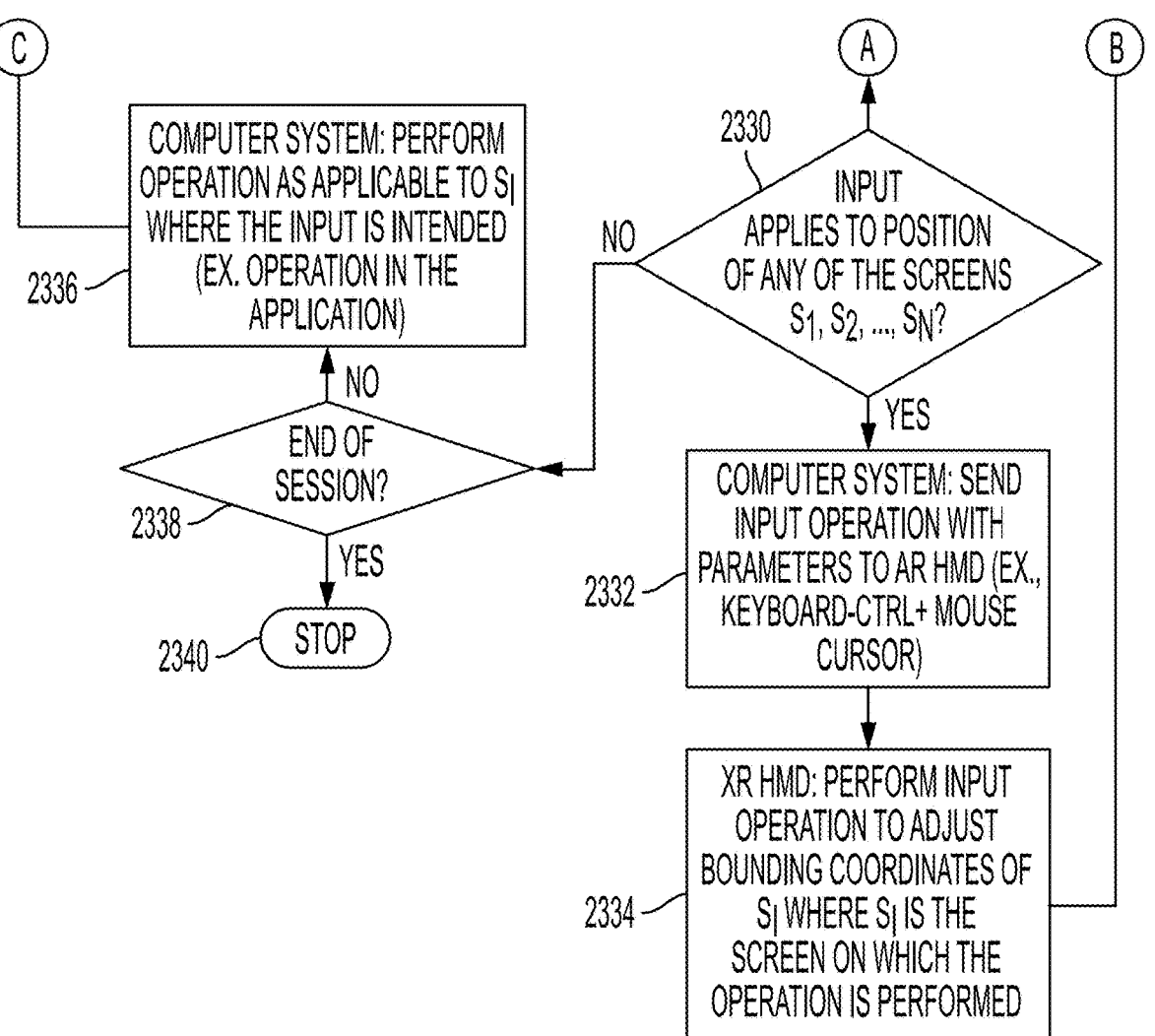

FIGS. 23A-23C illustrate a process 2300 for managing a cursor for more than one screen, according to an aspect of the disclosure. As shown in the embodiment of FIGS. 23A-23C, the physical device 101 may be the sole machine responsible for rendering all the applications locally or in the cloud. The virtual windows or displays may be rendered in 3D space by the XR HMD display after receiving the screen/application window GPU renderings as encoded video from the physical device 101.

The notation $S_i$ may represent the ith display, which may be a rectangular surface, whether plane or curved, bounded by four vertices in 3D coordinates that enclose the bounded surface (note: a surface is defined only by three points, however, a rectangular surface may be defined by four points). $S_0$ is the physical display, and $S_1$ to $S_n$ are the virtual displays. Physical display $S_0$ may house more than one application window rendered as tabs, while $S_1$ to $S_n$ are application windows that may have been dragged off the physical display into the 3D space as seen through the XR HMD. Sometimes herein application windows or displays are used interchangeably across the system architecture and method diagrams. It will be understood that more than one physical display may be driven by the physical device 101, in which case $S_0$ may be replaced by a plurality of physical displays $S_{0A}$ to $S_{0m}$. New user input may be used:

to change the cursor position on a screen or in free space.

to change the position of any of the screens.

as an operation that acts on a screen (e.g., open a new application) or an application window (e.g., retrieve content from a URL) etc.

to end session.

After system start at 2302, at 2304 the location $P_c$ of the cursor may be identified based on the primary display controller. In other instances, the current location of the cursor may be elsewhere than at the physical display 111. The physical device 101 may be render each display ($S_0$ to $S_n$) as shown at 2306. If at 2308 the cursor location $P_c$ is at the physical display 101 or at a virtual display, then operation continues to 2310.

At 2310, the system renders the cursor on the appropriate screen. At 2312, the physical device 101 renders the physical display 111, and at 2314 each virtual display 121, 123, 125 is rendered at its appropriate location by the XR equipment controller 1921. If at 2316 a new frame is called for, then at 2318 it is determined whether new user input is received. If so, then at 2320 it is determined whether the user input received affects the cursor position. If it does, then the process returns to 2304, where the new cursor location is identified. If the user input does not affect the cursor position then at 2330 it is determined whether the user input affects any of the virtual displays, in which case at 2332 the XR equipment controller 1921 is notified of the parameters of the rendering change. In response, at 2334, the XR equipment controller 1921 carries out the change to the relevant virtual display. If the user input has no effect on the displays, then at 2338 it may be decided to end the session at 2340. If not, then at 2336 a further operation may be performed to a relevant display.

On the other hand, if at 2308 it is determined that the cursor position is not on any of the displays, then at 2322 the system sends the input operation from the controller directly to the XR equipment controller 1921. The XR equipment controller 1921 interprets this operation to mean that the cursor is to be rendered in free space, which is done at 2324. If at 2326, the cursor is determined to have reached a physical or virtual display or window, then at 2328 the XR equipment controller 1921 returns rendering control of the cursor back to the physical device 101. The physical device 101 may then renders the cursor on $S_0$ (directly on the physical display), while sending the contents for $S_1$ to $S_n$ as encoded video to the XR equipment controller 1921. The XR HMD 411 then renders these virtual windows based on their locations in 3D space.

The thick lines in FIGS. 23A-23C represent one of a set of possibilities that occur at frame rate, i.e., each of the thick lines represent one path to a new render of the 3D world/content that must occur every frame. The frame rate for rendering and displaying the 3D content may be the higher of the frame rate of the physical display and the XR HMD displays. Typically, XR HMDs have higher frame rates, hence the algorithm would have to render the content at that rate. The physical device may, therefore, render at that higher frame rate. The physical display 111, however, may be rendered at the lower frame rate, by ignoring frames that arrive at a faster rate.

Figure 24A:
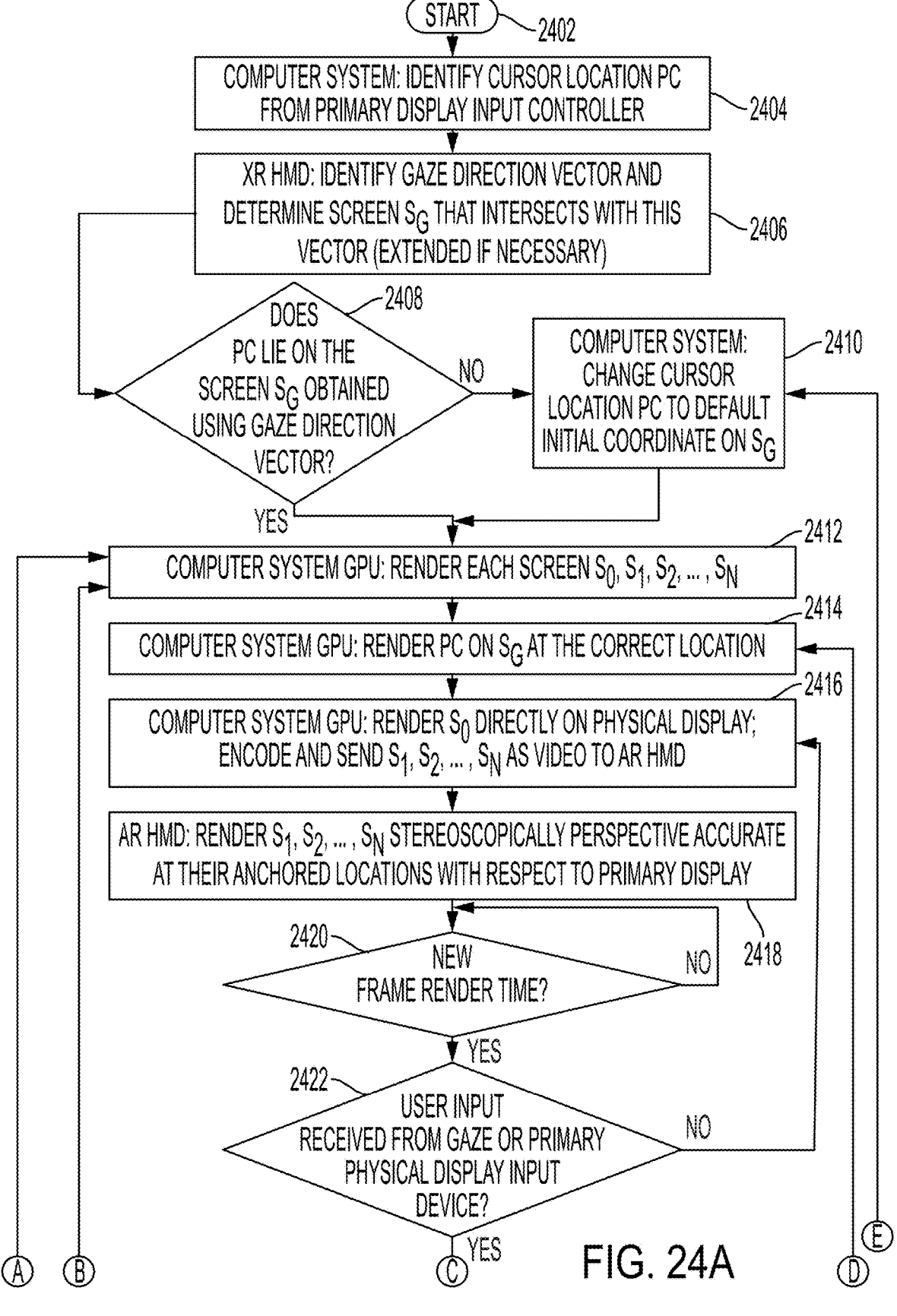
FIGS. 24A-24B illustrate a system for setting a display as the active display, according to an aspect of the disclosure.
Figure 24B:
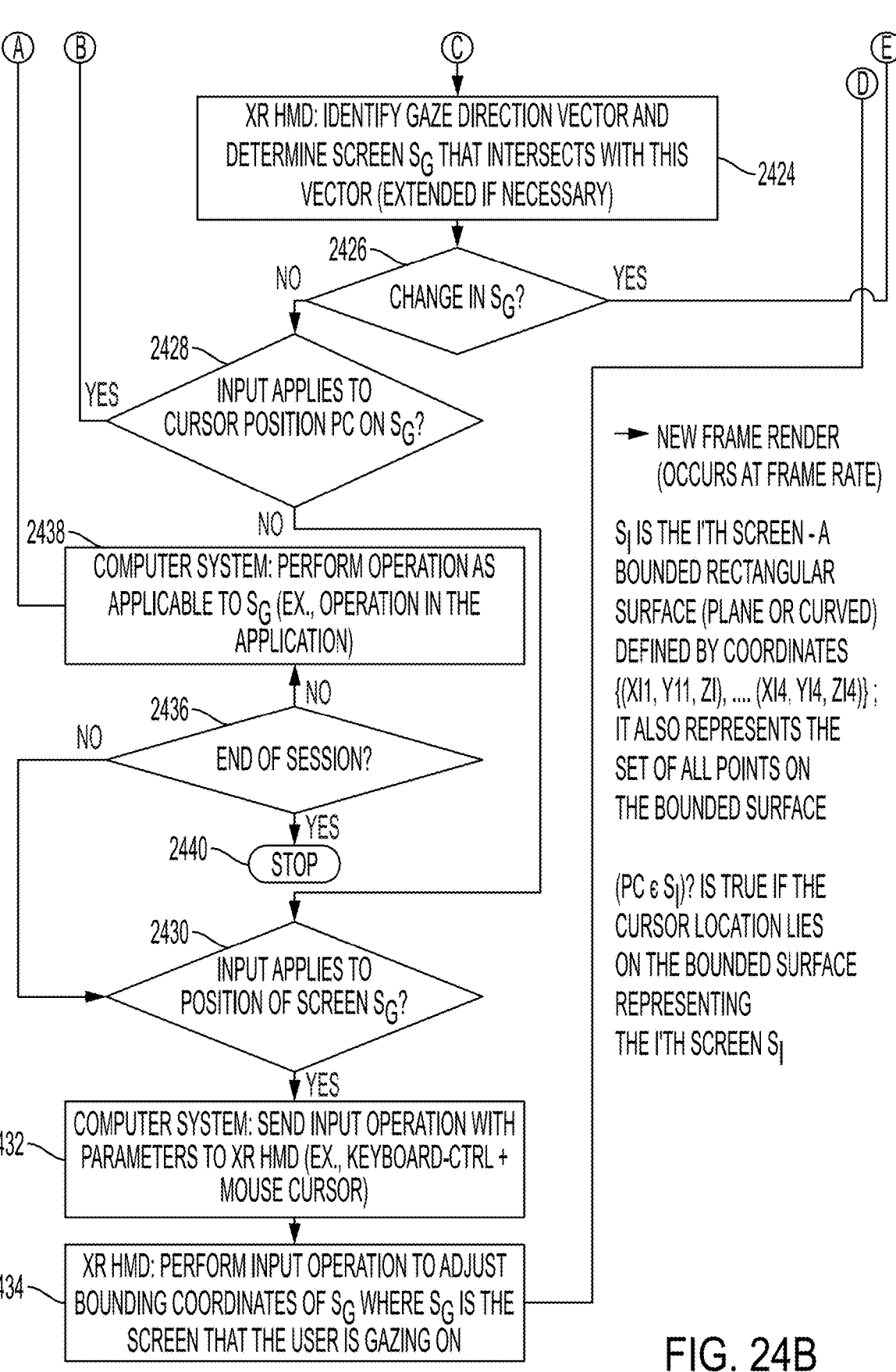

FIGS. 24A-24B illustrate methods for adaptively rendering the system's displays as a unified UI across the primary physical display(s) and the virtual displays 121, 123, 125, for example, using the arrangement illustrated in FIGS. 1 and 17. After system start at 2402, at 2404 the position of the cursor is identified based on a primary physical display controller. If more than one physical display has been set up, there may be one that is directly connected to the physical device 101 or one that was connected first to the physical device 101 that is the primary display. This may be done prior to rendering a new frame with 3D content.

At 2406, a direction of user gaze is identified to determine the active display. The XR HMD controller 1921 may frequently (for example, at the same rate as the frame rate) recalculate $S_g$ by determining an intersection of the eye gaze vector (extended if necessary) with the spatial coordinates of each screen ($S_0$ to $S_n$). If the screen of focus has not changed, then the cursor location is rendered on $S_g$, typically locked to $S_g$, such that the cursor cannot move outside the GUI area of $S_g$.

At 2408 it is determined whether cursor is at the same display as the active display. If not, then at 2410 the cursor location is set to the initial default coordinate on the primary physical display. If it is then at 2412 each display is rendered. At 2414, the system renders the cursor at the correct location of the display that was set to active. In an embodiment, several cursors may be visible at their most recent locations on each display. The cursor on the display that is set to currently active may be made more prominent, for example, may be larger or may be rendered in a different color or using a different symbol. At 2416, the system renders the contents of the physical display on the physical display 111 and sends the display contents for the virtual displays 101, 103, 105 to the XR controller 1921. In turn at 2418, the XR equipment controller 1921 renders each virtual display at their stereoscopic perspective at their anchored location with respect to the physical display 103. Then at 2420, the system determines whether it is time for a new frame rendering. If it is time, then at 2422, the direction of user gaze may again be determined and it may also be determined whether additional user input has been received at the physical controller 103. At 2424, the XR controller identifies the direction of user gaze and determines the display with which it intersects.

At 2426 it is determined whether there has been a change in the display to which the user's gaze is directed. If so, then processing returns to 2410. If there has been no change, then at 2428 it is determined whether newly received user input is to be applied to the cursor position of the active display. If yes, then processing returns to 2412 and each screen is newly rendered. If it is not to be applied to the cursor position, then at 2430 it is determined whether the input applies to a position of the active display. If yes, then 2432 the operation is transmitted with parameters to the XR equipment controller 1921, and at 2434 the XR equipment controller 1921 adjusts the bounding coordinates of the display to which the user gaze is determined to be directed. On the other hand, if the input does not affect a position of the active display, then at 2436 it determined whether the end of session has been reached. If yes, then at 2440 processing stops. If not, then at 2438 the system performs the operation applicable.

Figure 25:
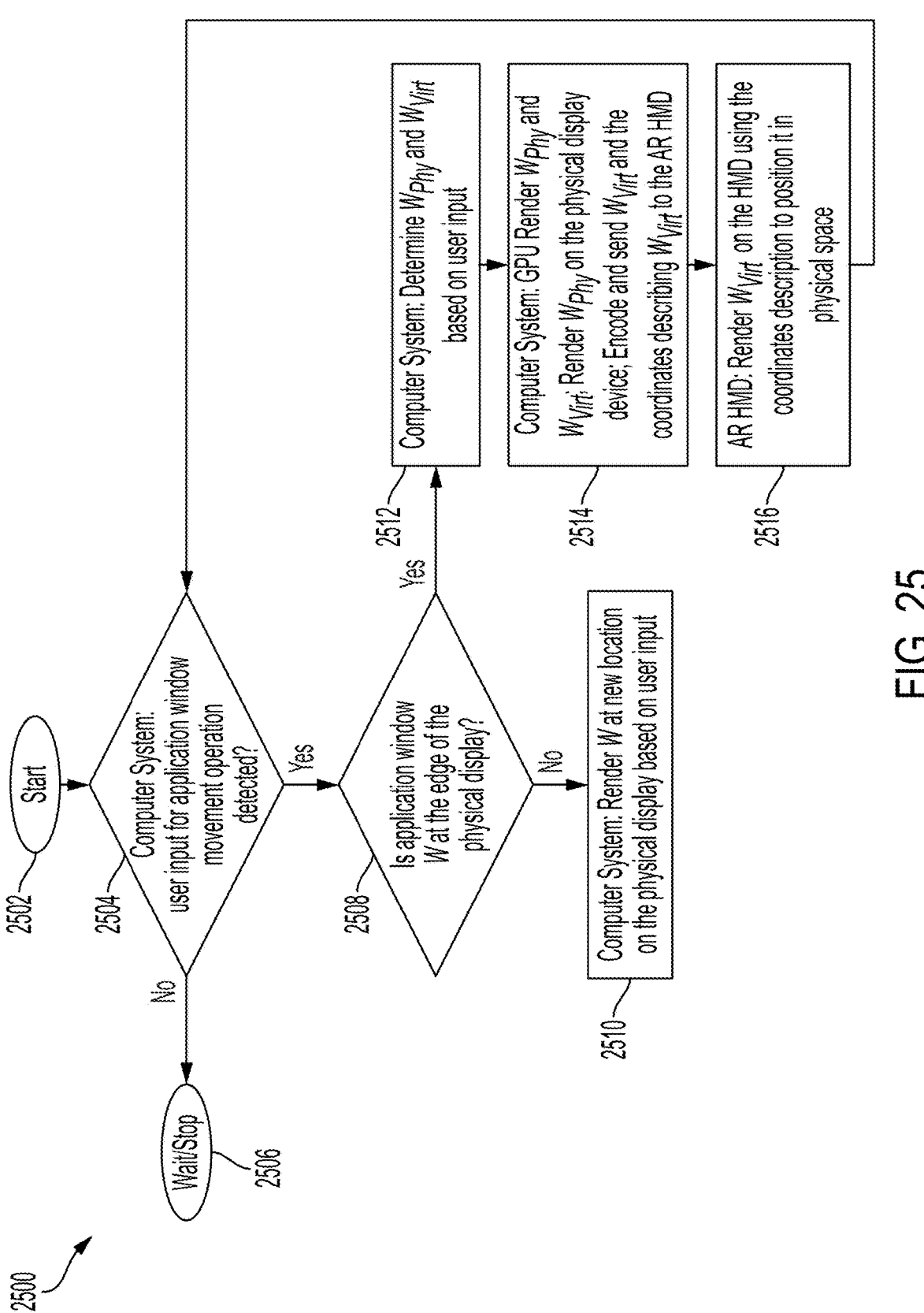
FIG. 25 illustrates a process for generating a virtual display by dragging a window, according to an aspect of the disclosure.

FIG. 25 shows a method 2500 for rendering an application window W that has been only partially "dragged" off a GUI provided via the physical display 111. After system start at 2502, at 2504 it is determined whether a user input for a window movement operation has been received. If not, then at 2506 processing is paused.

If yes, then at 2508 is it is determined whether the application window movement operation has caused the application window to pass the edge of the physical display's graphical user interface portion. In an embodiment, a virtual display may also be spawned from an existing virtual display in a similar manner to that described herein with respect to the physical display. That is, a window displayed on a virtual display may be dragged off to spawn a new virtual display. In a further embodiment, a virtual display may be terminated by dragging the only window thereof back to the physical display or to another virtual display. In an embodiment, a virtual display would continue to persist after a window thereof is dragged to another display.

If at 2508 it is determined that the edge of the application window has not passed the graphical user interface of the display, then at 2510, the system renders the application window at the new location on the same display. On the other hand, if at 2508 it determined that the edge of the application window has passed the graphical user interface area, then at 2512 the system determines physical and virtual components, WPhy and WVirt respectively (as shown in FIG. 9). At 2514, these are rendered on the appropriate displays: WPhy is rendered on the physical display 111. At 2516, WVirt is encoded and transmitted to the XR equipment controller 1921 with the coordinate description that allows the HMD or other XR HMD 411 to render the window accurately on the chosen z-plane using (x, y) locations in the reference coordinate system. For example, as shown on FIG. 9, the WVirt coordinate description may be a closed surface described by {(x4, y4)–(x5, y5)–(x8, y8)–(x7, y7)–(x1, y1)–(x6, y6)–(x4, y4)}. A common z-coordinate plane (omitting z coordinate since it is common) may be assumed, however, the method may be implemented using a reference coordinate system in which the plane of movement for "dragging" the window is described using all three cartesian (x, y, z) coordinates or other coordinate systems (ex., polar coordinates).

Figure 26A:
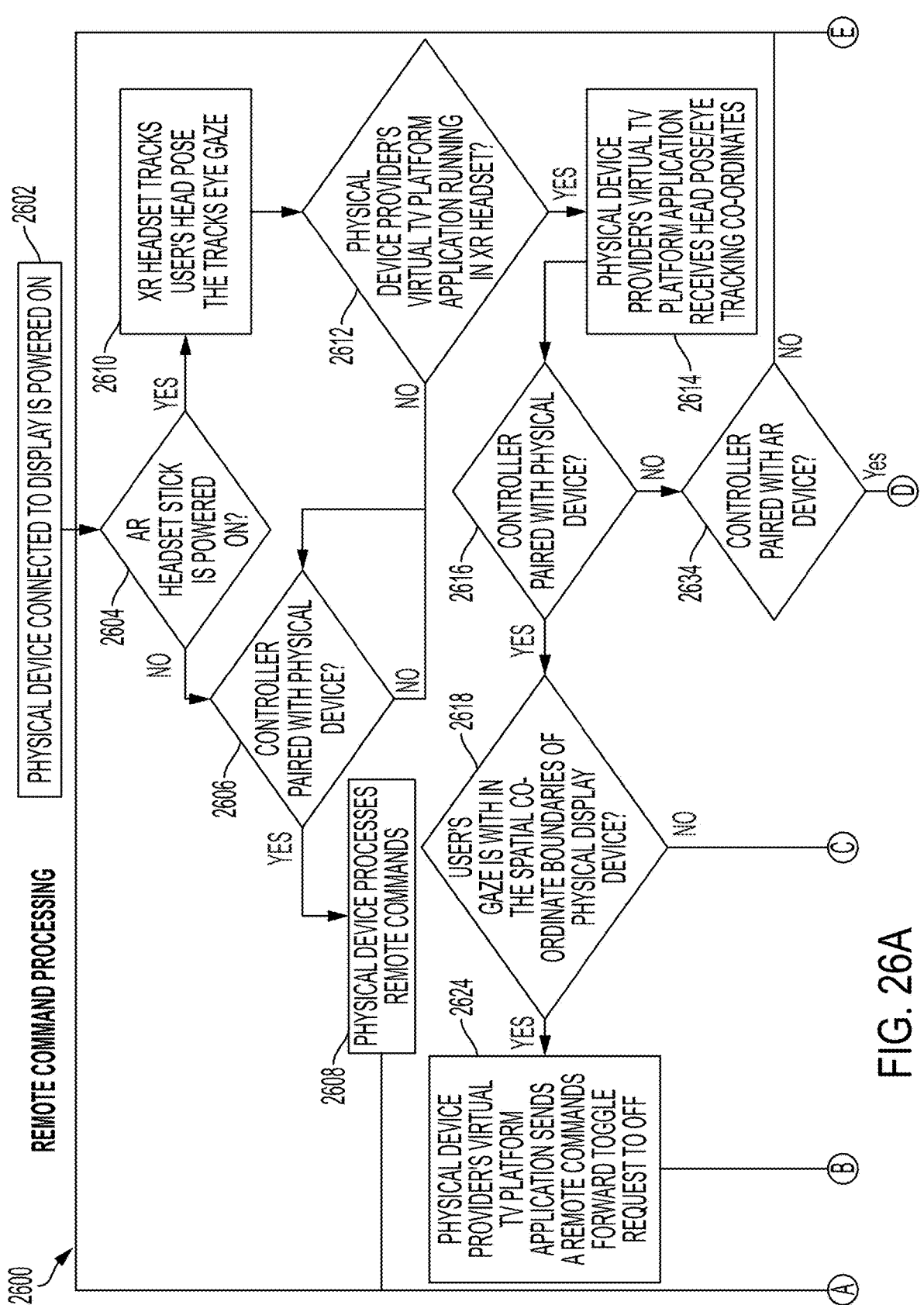
FIGS. 26A-26C illustrate a system operation for rendering the physical and virtual displays, according to an aspect of the disclosure.
Figure 26B:
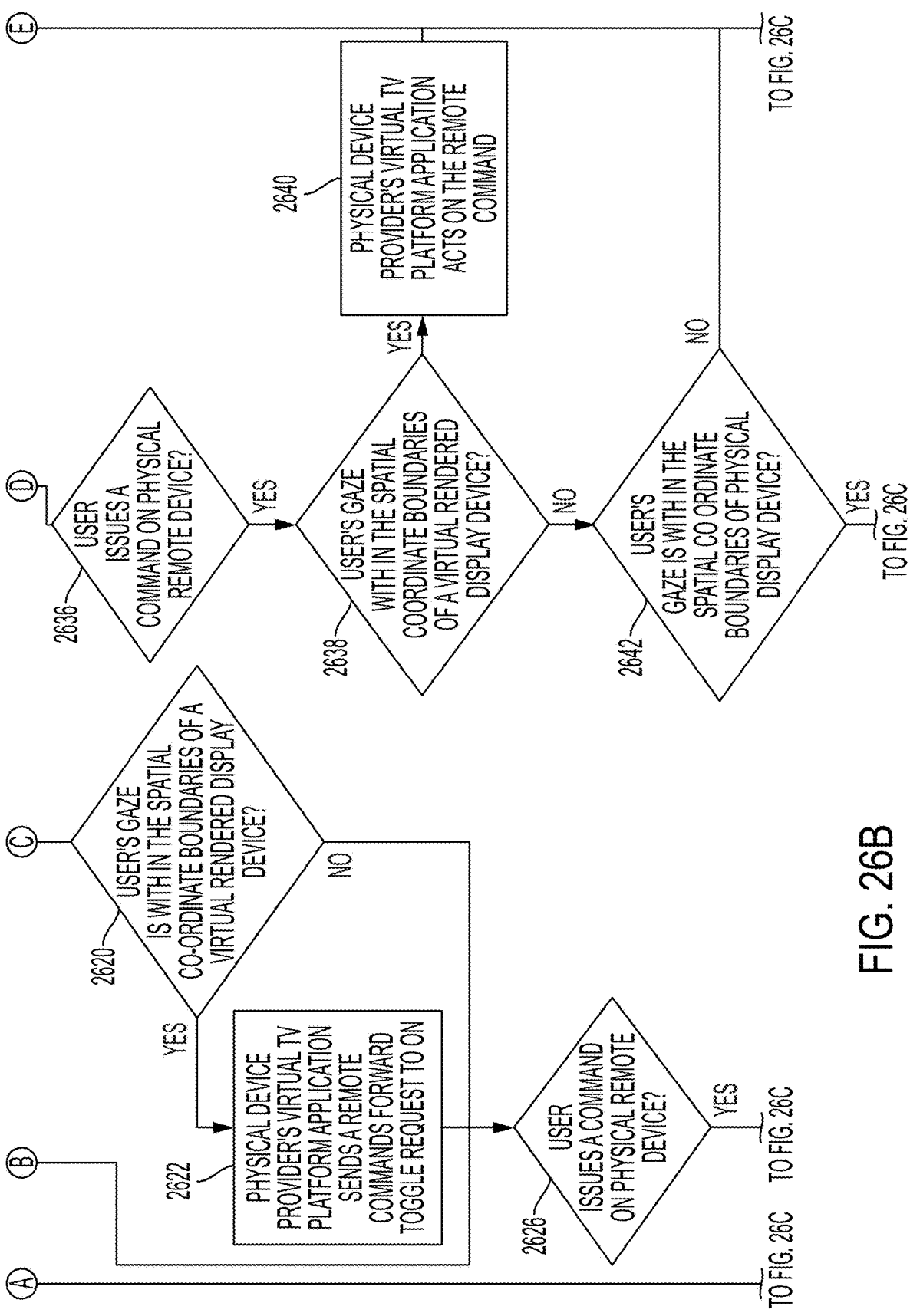
Figure 26C:
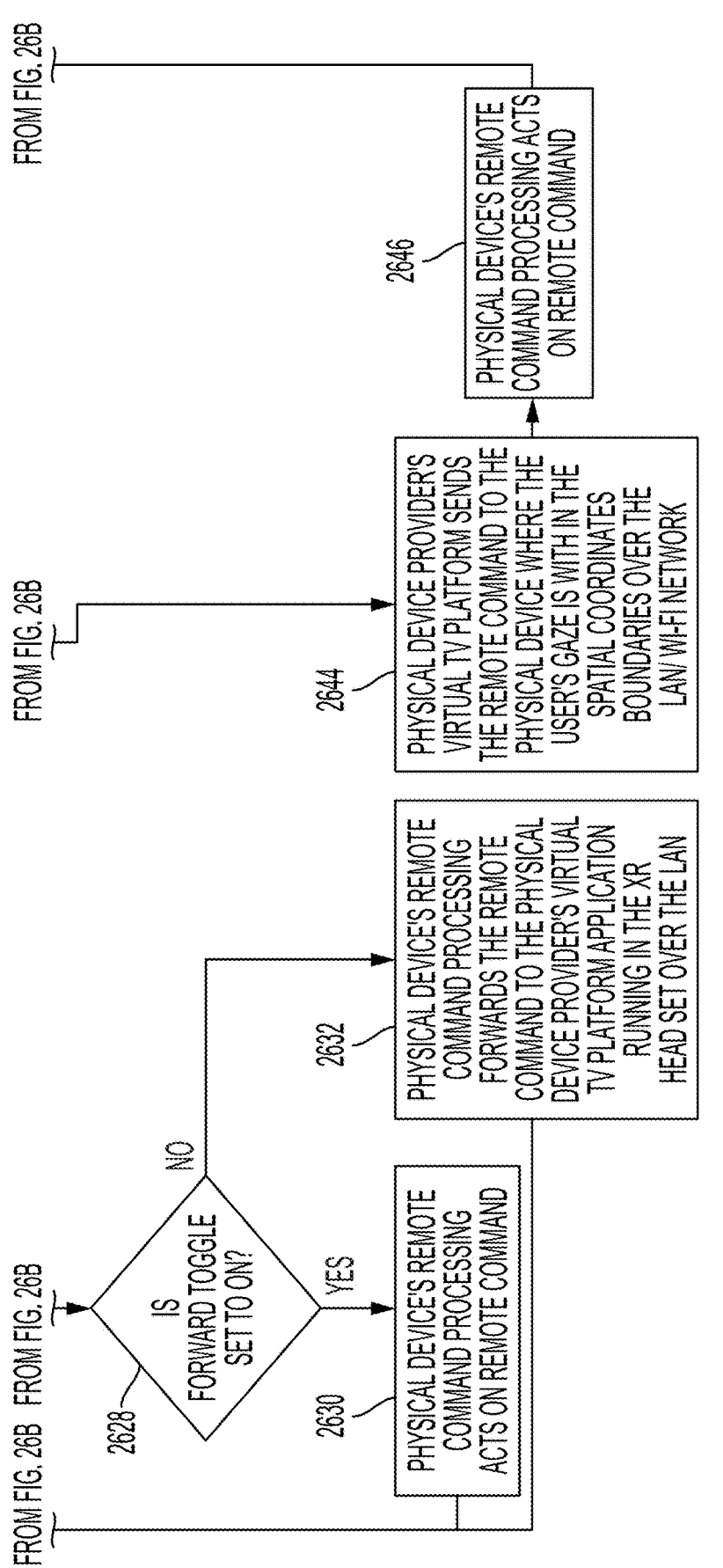

FIGS. 26A-26C illustrate command processing shown schematically in FIGS. 4 and 5. At 2602 the physical device 101 connected to the physical display 103 and powered on. At 2604 it is determined whether the XR Headset 411 is powered on. If not, then at 2606 it is determined whether the controller is paired with the physical device 101. If it is paired, then at 2608 the physical device 103 processes commands that are received. If at 2604 it is determined that the connection of the XR HMD 411 is on, then at 2610 the direction of user gaze is determined based on head and eye movement tracking. Then, at 2612, is determined whether the XR HMD controller 1921 is running the Virtual TV Platform Application in the XR HMD controller 411. This would be like a virtual Amazon prime stick, virtual TiVo STB or HDMI stick. If it is, then at 2614 the XR HMD controller 1921 receives gaze information. At 2616 is determined whether the XR HMD controller 1921 has been paired with the physical device 101. If it has then at 2618 is determined whether the gaze previously detected is within the spatial coordinate boundaries of the physical display 103. If it is within those boundaries, then the physical device providers virtual display application sends a request to not forward remote commands to Virtual TV Platform Application running on the XR HMD controller 1921. When the directional user gaze is detected to be not within the spatial coordinate boundaries of the physical display 111, then at 2620 it is determined whether the gaze is within the spatial coordinate boundaries of one of the virtual displays. If it is, then at 2622, the virtual display application sends a request to forward remote commands to Virtual TV Platform Application running on the to the XR HMD controller 1921. If it is not within the spatial coordinate boundaries of the virtual display, then at 2624 the virtual display application of the of the physical device 101 sends a request to not forward remote commands to Virtual TV Platform Application running on the to the XR HMD controller 1921.

At 2626, it is determined whether a user command has been received via the physical controller 103. If yes, then at 2628, it is determined whether new input has been received via the physical remote controller 103. If new input has been received, then at 2630 it is determined whether the forward toggle is set to on, meaning that the command is for the virtual display. In this case, at 2632 the virtual device processing application or the physical device 101 forwards the input to the XR equipment controller 1921 for rendering on the HMD 411. But if at 2628 the toggle is determined to be off, then at 2630 the Virtual TV Platform Application running on the XR HMD controller of the physical device acts on the remote command.

On the other hand, if at 2616 is determined that the controller is not paired with the physical device 101, then at 2634 the controller determines whether the controller is paired with the XR equipment controller 1921. If so then, if at 2636 it is determined that a new user command is received via the physical controller 103, then at 2638 it is determined whether the user's gaze is directed at coordinates that lie within boundaries of a virtual display. If so, than at 2640 the virtual display platform application of the physical device acts on the input. If the user's gaze is not directed to a virtual display, then at 2642 it is determined whether the user's gaze is directed at the physical display. If so, then at 2644 the physical device sends a command to the physical device to act on the remote command.

On the other hand, if at 2616 it is determined that the physical controller 103 is paired with the physical display come on then at 2618 the users gaze is determined to be within these spatial coordinates of the physical just play then at 2624 the physical device's virtual TV platform application sets the remote commands toggle to OFF. If the user's gaze is determined at 2618 to be directed away from the physical display, then at 2620, it is determined whether the user is gaze lies within the boundaries of the spatial coordinates of a virtual display. If yes, then at 2622, the physical device providers virtual platform application sets to ON the forward toggle. At 2626, it is determined whether the user issues a command on remote physical device for controller 103, and so that 2628 it is determined whether the forward toggle is set to on. If so, then at 2632, the physical device's remote processing application sends the user command via a local area network to the virtual TV platform application running in the XR HMD 411. If the forward toggle is not on, then at 2630 the physical device's command processing acts on the user command.

The methods or processes 2200-2600 may be implemented, in whole or in part, by the system(s) described herein and shown in the figures. One or more actions of the depicted processes may be incorporated into or combined with one or more actions of any other process or embodiments described herein. The processes may be saved to a memory or storage (such as any one or more of those shown in FIGS. 18-21B) as one or more instructions or routines that may be executed by a corresponding device or system to implement the process. Depending on the embodiment, one or more steps of the described process may be implemented or facilitated by a server. While some of the description corresponding to the processes 2200-2600 references HMDs, it will be appreciated that the described steps may be implemented with respect to any suitable XR device in some embodiments.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:
   controlling a physical display in response to a first user input received via a physical controller logically connected to the physical display;
   generating a first virtual display based at least in part on a second user input via the physical controller, wherein the first virtual display is visible via extended reality equipment (XR equipment) different from the physical display and from the physical controller;
   selecting the first virtual display as a display of focus based at least in part on a user focus input via the XR equipment or via the physical controller;
   receiving indication of a third user input via the physical controller requesting cursor movement off the first virtual display; and
   based at least in part on the selecting the first virtual display as the display of focus, preventing the cursor movement off the first virtual display.

2. The method of claim 1, wherein the physical controller is one or more of a keyboard, a trackpad, a mouse, a joystick, a gaming controller, gaming console, or an appliance remote controller.

3. The method of claim 1, further comprising:

generating a second virtual display based at least in part on a further user input, wherein the second virtual display is positioned so as to be visible via the XR equipment on a same virtual plane as the first virtual display.

4. The method of claim 1, further comprising:

moving a position of the first virtual display in relation to the physical display based at least in part on receiving, via the physical controller, a position change user input.

5. The method of claim 1, further comprising:

moving the first virtual display to a second position based at least in part on a detection of a movement of the physical display, such that a relative position of the first virtual display in relation to a position of the physical display remains unchanged.

6. The method of claim 1, further comprising:

selecting the first virtual display as the display of focus based at least in part on receiving a user input via the XR equipment comprising one or more of a head movement or an eye movement; and in response to the selecting of the first virtual display as the display of focus, controlling the first virtual display based at least in part on a further user input received via the physical controller.

7. The method of claim 6, further comprising:

based at least in part on the selecting of the first virtual display as the display of focus, repositioning the first virtual display.

8. The method of claim 1, further comprising:

selecting the first virtual display as the display of focus based at least in part on receiving, via the physical controller, a user input repositioning a cursor; and based at least in part on the selecting of the first virtual display as the display of focus, controlling the first virtual display by a further user input received via the physical controller.

9. The method of claim 1, further comprising:

receiving a subsequent user focus input via the XR equipment or via the physical controller, wherein the subsequent user focus input indicates selecting of the physical display as the display of focus;

receiving, concurrent with or after the subsequent user focus input, a fourth user input via the physical controller requesting a second cursor movement off the first virtual display; and based at least in part on the fourth user input, enabling the second cursor movement off the first virtual display.

10. The method of claim 1, further comprising:

based at least in part on receiving a subsequent user focus input via the XR equipment or via the physical controller, resuming a previous cursor position on the physical display, wherein the subsequent user focus input indicates selecting of the physical display as the display of focus.

11. The method of claim 1, further comprising:

receiving a subsequent user focus input via the XR equipment or via the physical controller that indicates selecting of the physical display as the display of focus;

based at least in part on the receiving the subsequent user focus input, displaying a cursor as it moves between the first virtual display and the physical display.

12. A system comprising:

communication circuitry configured to receive a first user input via a physical controller logically connected to a physical display;

processing circuitry configured:

to control the physical display in response to the first user input;

to generate a first virtual display based at least in part on a second user input via the physical controller, wherein the first virtual display is visible via extended reality equipment (XR equipment) different from the physical display;

to select the first virtual display as a display of focus based at least in part on a user focus input via the XR equipment or via the physical controller;

to receive indication of a third user input via the physical controller requesting cursor movement off the first virtual display; and to prevent, based at least in part on the selecting the first virtual display as the display of focus, the cursor movement off the first virtual display.

13. The system of claim 12, wherein the physical controller is one or more of a keyboard, a trackpad, a mouse, a joystick, a gaming controller, gaming console, or an appliance remote controller.

14. The system of claim 12, wherein the processing circuitry is further configured:

to generate a second virtual display based at least in part on a further user input, wherein the second virtual display is positioned so as to be visible via the XR equipment on a same virtual plane as the first virtual display.

15. The system of claim 12, wherein the processing circuitry is further configured:

to move a position of the first virtual display in relation to the physical display based at least in part on receiving, via the physical controller, a position change user input.

16. The system of claim 12, wherein the processing circuitry is further configured:

to move the first virtual display to a second position based at least in part on a detection of a movement of the physical display, such that a relative position of the first virtual display in relation to a position of the physical display remains unchanged.

17. The system of claim 12, wherein the processing circuitry is further configured:

to select the first virtual display as a display of focus based at least in part on receiving a user input via the XR equipment comprising one or more of a head movement or an eye movement; and in response to the selecting of the first virtual display as the display of focus, to control the first virtual display based at least in part on a further user input received via the physical controller.

18. The system of claim 17, wherein the processing circuitry is further configured:

to reposition, based at least in part on the selecting of the first virtual display as the display of focus, the first virtual display.

19. The system of claim 12, wherein the processing circuitry is further configured:

to select the first virtual display as the display of focus in response to receiving, via the physical controller, a user input repositioning a cursor; and based at least in part on the selecting of the first virtual display as the display of focus, to control the first virtual display by a further user input received via the physical controller.

20. The system of claim 12, wherein the processing circuitry is configured to cause resuming, based at least in part on receiving of a subsequent user focus input via the XR equipment or via the physical controller that indicates selecting of the physical display as the display of focus, a previous cursor position on a user interface area of the physical display.

* * * * *